United States Patent [19]

Angert

[11] Patent Number: 5,799,090
[45] Date of Patent: Aug. 25, 1998

[54] PAD ENCRYPTION METHOD AND SOFTWARE

[76] Inventor: Joseph C. Angert, 5308 Reber Pl., St. Louis, Mo. 63139

[21] Appl. No.: 533,314

[22] Filed: Sep. 25, 1995

[51] Int. Cl.[6] .................... H04L 9/18; H04L 9/00
[52] U.S. Cl. .................... 380/43; 380/9; 380/28; 380/42; 380/46; 380/49; 380/44
[58] Field of Search .................... 380/9, 28, 42, 380/43, 46, 49, 50, 59, 33, 44

[56] References Cited

U.S. PATENT DOCUMENTS

| | | | |
|---|---|---|---|
| 1,310,719 | 7/1919 | Vernam | 380/33 |
| 4,429,180 | 1/1984 | Unkenholz | |
| 4,558,176 | 12/1985 | Arnold et al. | |
| 4,733,345 | 3/1988 | Anderson | 380/25 |
| 4,759,063 | 7/1988 | Chaum | 380/30 |
| 4,853,962 | 8/1989 | Brockman | 380/44 |
| 4,879,747 | 11/1989 | Leighton et al. | 380/23 |
| 4,897,875 | 1/1990 | Pollard et al. | 380/21 |
| 4,926,479 | 5/1990 | Goldwasser et al. | 380/23 |
| 4,995,081 | 2/1991 | Leighton et al. | 380/23 |
| 5,001,754 | 3/1991 | Deffeyes | 380/46 |
| 5,003,596 | 3/1991 | Wood | 380/28 |
| 5,113,444 | 5/1992 | Vobach | 380/47 |
| 5,159,632 | 10/1992 | Crandall | 380/28 |
| 5,159,634 | 10/1992 | Reeds, III | 380/42 |
| 5,161,244 | 11/1992 | Maurer | 380/43 |
| 5,237,614 | 8/1993 | Weiss | 380/23 |
| 5,266,942 | 11/1993 | Stoller | 380/825.34 |
| 5,271,061 | 12/1993 | Crandall | 380/28 |
| 5,272,754 | 12/1993 | Boerbert | 380/25 |
| 5,276,735 | 1/1994 | Boebert et al. | 380/21 |
| 5,293,576 | 3/1994 | Mihm, Jr. et al. | 380/21 |
| 5,297,207 | 3/1994 | Degele | 380/46 |
| 5,307,410 | 4/1994 | Bennett | 380/21 |
| 5,335,280 | 8/1994 | Vobach | 380/42 |
| 5,337,362 | 8/1994 | Gormish et al. | 380/54 |
| 5,371,794 | 12/1994 | Diffie et al. | 380/21 |
| 5,412,729 | 5/1995 | Liu | 380/37 |
| 5,440,640 | 8/1995 | Anshel et al. | 380/46 |

OTHER PUBLICATIONS

D.E.R. Dennig, *Cryptography and Data Security*, (Addison–Wesley, 1982; pp. 86–87).

*Primary Examiner*—Bernarr E. Gregory
*Attorney, Agent, or Firm*—Robert P. Sabath; Edward Weller

[57] ABSTRACT

A pad encryption software architecture includes space on a floppy for storing the pad to be used with the encryption software. The pad is XOR generated with random numbers subject to redetermined offsets. If the pad is smaller than the text to be encrypted, then XOR takes several cycles with redetermined offsets used in XORing the pad with the remaining plain text to be encrypted. The offset is determined from a user selected password. New offsets are determined from old offsets by adding the current offset to the value of the byte in the pad located at the offset value.

16 Claims, 5 Drawing Sheets

PAD ENCRYPTION METHOD AND SOFTWARE

FIELD OF INVENTION

This invention relates generally to encryption methods and software, and more particularly to stream ciphers and one time pad encryption methods and software.

BACKGROUND OF THE INVENTION

One time pad encryption methods are well known. The first such method was invented in 1917 by Major Joseph Mauborgne and AT&T's Gilbert Vernam. Classically, a one time pad is a key of random letters, written on sheets of paper bound together in a pad. The pad is used to encrypt plain text and to decrypt the encrypted ciphertext. The pad is kept secret, and can be referred to as a private key. For security, the pad has the same or more letters than the message being encrypted. Accordingly, the pad is cumbersome, because it requires a large number of letters.

A one time pad provides perfect encryption, provided the letters of the pad are truly random. However, the burden of using a pad which is the same or a greater size than the text being encrypted makes one time pad methods generally non-applicable to consumer uses.

Encryption becomes less than perfect, if the key is less than perfectly random.

It would be beneficial to have a one time pad method which employs less random letters than the size of the message being encrypted.

It would be beneficial to enhance the security of one time pad methods which rely upon less than perfectly random, i.e., pseudo random, pads.

SUMMARY OF THE INVENTION

According to the present invention, characters for a pad are generated by selecting a seed file, extracting a first value from the seed file, generating a random number, and logically combining the first value with the random number to generate a first random character of the pad. To generate a next random character of the pad, a next value is extracted from the selected seed file, a next random number is generated, and the next random number is combined logically with the next value from the selected seed file to generate a next random character of the pad. This process repeats itself until a desired number of pad characters have been developed.

According to an embodiment of the present invention, logical combination by exclusive OR, i.e., XOR, is performed to generate a first random character. According to an embodiment of the present invention, a pad is produced having on the order of approximately 20,000 random characters.

According to the present invention, a user selects plain text to be encrypted and XORs the plain text with a pad at determined offset, to produce output cipher text. If the plain text is larger in number of characters than the pad, the pad is reused at a redetermined offset for XORing the not yet enciphered portions of the plain text. According to one embodiment of the present invention, the offset is a function of a user selected password. According to one embodiment of the present invention, the pad includes the user selected password or a derivative thereof.

According to the present invention, a pad is created with a software program stored on a selected memory medium a which space is reserved for storage of the pad created. Once the pad is created, it is stored at the reserved space. According to one embodiment of the present invention, the pad is additionally stored at another location for security. According to one embodiment of the present invention, the pad is stored on a flash card. According to one embodiment of the present invention, the software program is stored on a floppy disk. According to one embodiment of the present invention, the pad is stored at a reserved space on the floppy disk. According to one embodiment of the present invention, the software program is installed on a hard disk. According to one embodiment of the present invention, the pad is created by the software program with a seed file located on a hard disk drive, i.e., a hard drive.

DESCRIPTION OF THE PREFERRED EMBODIMENT

Figure 1:
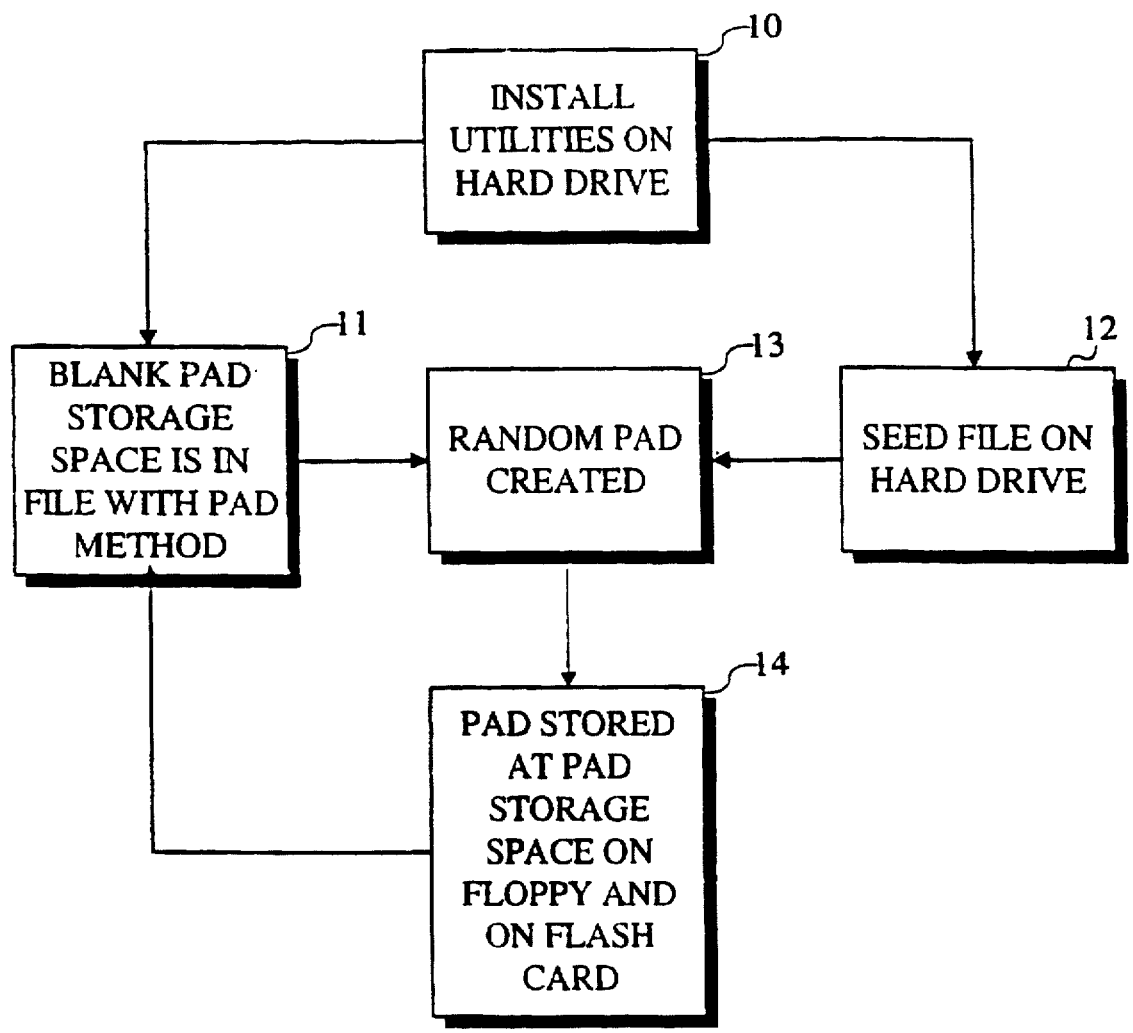
FIG. 1 is a flow diagram of a method according to the present invention, showing creation of a pad with a seed file and storage of the pad created on a flash card and at a blank space on a floppy disk carrying a software program creating the pad.

FIG. 1 is a flow diagram of a method according to the present invention, showing installation 10 of a software pad and encryption program having blank spaces for storage of a pad sequence to be generated by running the pad & encryption program, as will be discussed in detail below. In particular, the program is operated from an external storage source such as for example a floppy, a PCMCIA card, or a PC card. Utilities such as compression and help programs can be installed from the external storage source to a hard disk for operation with the external storage source. An example of one such utility program according to the present invention is shown in the appendixes attached hereto.

According to one embodiment of the present invention, operation of the pad & encryption program according to the invention is done on a personal computer (PC). The pad & encryption program according to an embodiment of the present invention, is originally stored on a floppy disk. Space is reserved on the floppy disk for storage of the pad which is generated. A seed file is identified 12 on the hard drive.

A random pad is created 13 by XORing pseudo random numbers with the seed file located on the hard drive on which the pad & encryption program is installed, according to one embodiment of the present invention. A seed file can be an arbitrary or selected text or non-text file on the hard drive of a personal computer which is randomly or purposefully selected for XOR processing with the pad. A purely random pad is typically not feasibly obtained from computer operation, in view of the regularity of computer operation. However, a computer can generate pseudo random numbers, as is well known. Accordingly, random pad can feasibly be established by computer operation in conjunction with an external source—in this case the user supplied seed file.

Exclusive OR operation can be performed as follows, with the following first and second bytes:

```
BYTE ONE = 10100100
BYTE TWO = 11001110
     XOR = 01101010
```

In short, any bit match between the two bytes yields FALSE, any bit mismatch yields TRUE.

The XOR operation can be undone in two ways, to regenerate BYTE ONE, or BYTE TWO, as desired. In particular, BYTE ONE is regenerated by XORing the first XOR result with BYTE TWO, as follows:

```
     XOR = 01101010
BYTE TWO = 11001110
BYTE ONE = 10100100
```

Similarly, BYTE TWO is regenerated by XORing the first XOR result with BYTE ONE, as follows:

```
     XOR = 01101010
BYTE ONE = 10100100
BYTE TWO = 11001110
```

The random pad created is stored 14 at the blank space on the floppy disk or other storage location selected, according to an embodiment of the present invention. The random pad which has been created can additionally be stored 14 on a flash card which has been prepared by burning a PCMCIA program onto it, according to an embodiment of the present invention. According to the present invention, once encryption has been completed and the encrypted text has been stored on a hard disk on a computer or elsewhere, the pad number or sequence must be separated from the encrypted number. If the pad number or sequence is stored proximally to the encrypted text, there is no security for the encrypted text, because a third party having access to the encrypted text also can use the pad to decrypt the encrypted text. Having the pad on a PCMCIA card, a medium which is non-volatile and more robust than the typical floppy disk, permit the encrypting user to separately maintain the encrypted text and the key, i.e., the pad, which can be used to access the encrypted text. Typically, it is desired to have a back-up for the pad stored on the PCMCIA card. Accordingly, it is one embodiment of the present invention to store the pad at a predetermined location within the pad & encryption program, preferably on the installation disk used to install the pad & encryption program on the PC hard drive for operation, including generation of a pad. According to one embodiment of the present invention, the pad & encryption program is mounted on a selected memory medium, which may be magnetic or optical. According to one embodiment, the pad & encryption program is stored on a magnetic floppy disk and is installable on a magnetic hard drive. According to one embodiment, the pad & encryption program includes software modules including but not limited to a pad creation module, an encryption module, an installation module, and an initially blank or zeroed pad sequence storage module or region.

Figure 2:
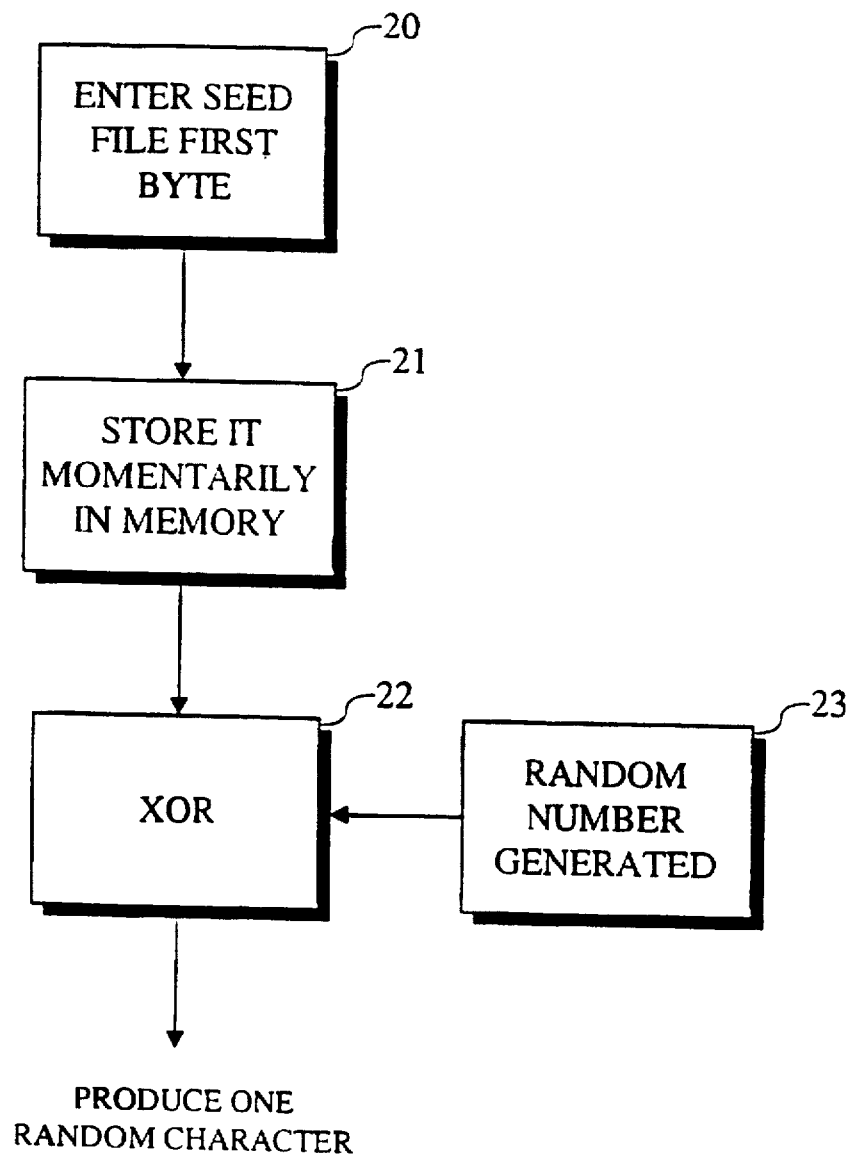
FIG. 2 is a flow diagram of a method according to the present invention, showing creation of a random character by XORing pseudo random numbers with corresponding characters of a selected seed file.

FIG. 2 is a flow diagram of a method according to the present invention, showing creation of successive random characters by XORing pseudo random numbers with corresponding characters of a selected seed file. In particular according to the present invention, characters for a pad are generated by selecting a seed file and entering 20 the seed file at a first byte thereof. A seed file is any selected file containing elements, bits, values, or characters. It is called the "seed file" for convenience herein, because it is the file from which bits for example are obtained which after a particular logical operation give birth to the desired pad which is used for encryption purposes according to the present invention. The first byte is stored 21 in a memory (e.g., RAM memory) momentarily, serving as a first value from the seed file. Further, a pseudo random number is generated 23, and the pseudo random number is logically combined, by exclusive OR, i.e., XOR, operation, with the first value extracted from the seed file, to generate a first random character of the pad. To generate a next random character of the pad, the process of FIG. 2 is repeated, and successive values, e.g., bytes, are extracted from the selected seed file for logical combination with successively generated pseudo random numbers. Each pseudo random number is generated in succession, and each next pseudo random number is combined logically with the next value from the selected seed file to generate a next random character of the pad. This process repeats itself until a desired number of pad characters have been developed or produced. For purposes of this invention, created, produced and generated have the same meaning. According to an embodiment of the present invention, logical combination by exclusive OR, i.e., XOR, is performed to generate the random characters of the pad. According to an embodiment of the present invention, the pad produced can have on the order of approximately 20,000 random characters. According to an embodiment of the present invention, random number generation produces pseudo random numbers by pseudo random number generation.

Figure 3:
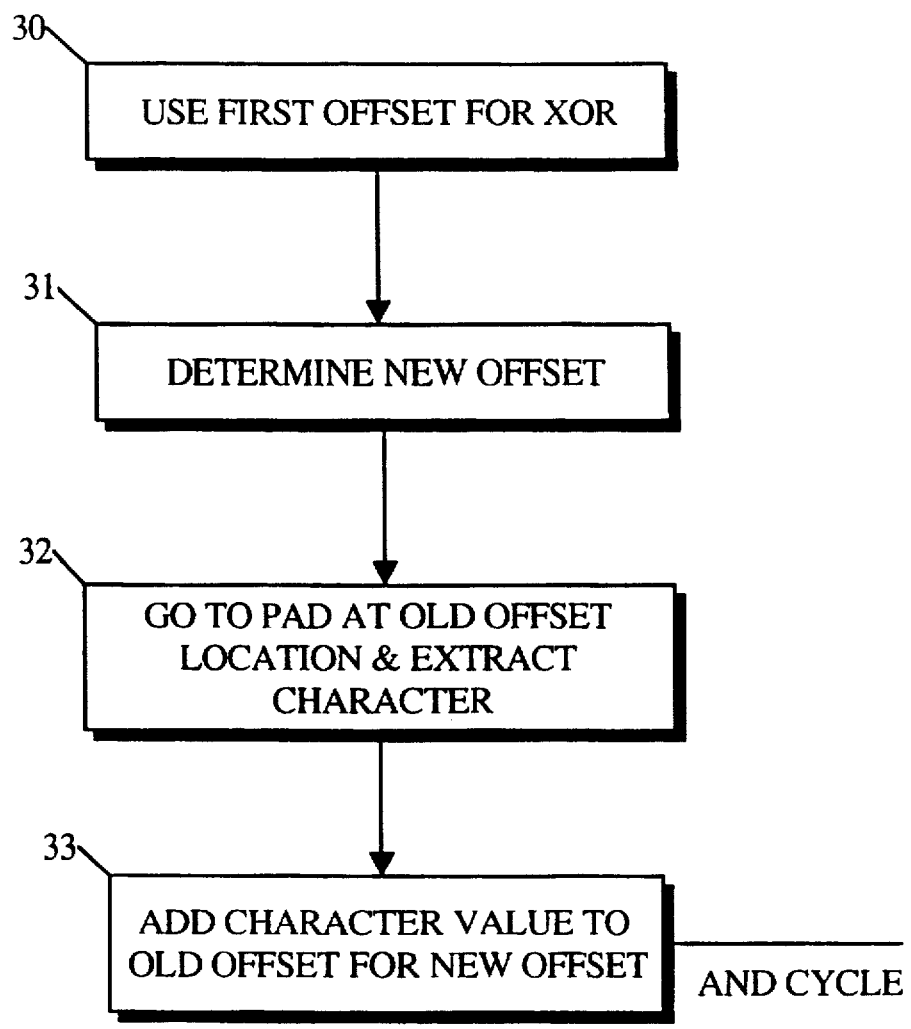
FIG. 3 is a flow diagram of a method according to the present invention, showing the determination of an offset applied to the pad before XORing with a corresponding character of plain text to be encrypted.

FIG. 3 is a flow diagram of a method according to the present invention, showing the determination of an offset or setoff applied to the pad before XORing with a corresponding character of plain text to be encrypted. According to one embodiment of the present invention, the offset determines which character of a pad string will correspond with a counterpart character of plain text during XOR operation, to raise the security level of encryption. Thus, for a zero offset, the first character of a pad string will be XORed with the first character of plain text to be encrypted. A second character of a pad string will be XORed with the second character of plain text to be encrypted and so on.

With an initial setoff of two, on the other hand, the third character of a pad string will be XORed with the first character of plain text to be encrypted. A fourth character of a pad string will be XORed with the second character of plain text to be encrypted and so on.

The beneficial use in enhancing security of plain text to be encrypted with the use of a changed pad setoff arises from the fact that to avoid susceptibility of the encrypted text to undesired decryption, the pad must be as long as the plain text to be decrypted. If the plain text is longer than the pad, security requires that a new pad be used, otherwise the encryption can be broken, by relying upon the establishment of a pattern with reuse of the same pad for the remainder of the plain text left over after the first portion has been encrypted with the pad. According to the present invention, this disadvantage is avoided by using a first pad setoff for encryption of a first portion of the plain text being encrypted and a second, independent pad setoff for another portion of the plain text, which is left over after the first portion has been encrypted.

According to the present invention, XOR logical conversion of a particular pad generated and plain text selected for a first encryption level is performed 30 with a first offset. A new offset can be determined 31 by adding the value of an older offset with a selected non-negative integer value derived from the pad 32 relative to the older offset valve, and applying the offset to determine the pad characters to be XORed with further plain text characters. Accordingly, in order to continue first level encryption with the remainder of the plain text, one enters the pad at the location specified by the new offset valve. For subsequent offsets in further cycles, the process is repeated.

Thus, according to one embodiment of the present invention, the offset can be redetermined for each cycle in accordance with the flow chart of FIG. 3. A cycle is defined as the point when a pad string has been completely used in XOR operation to perform a first order encryption of a portion of a plain text file. For example, if the pad string contains n characters or bytes, and the offset is 5, then the first character of the plain text is logically combined with a character from the pad defined by the offset 5. The characters initially skipped can be eliminated entirely from use, according to one embodiment, or they can be used at the end of a particular cycle.

Figure 4:
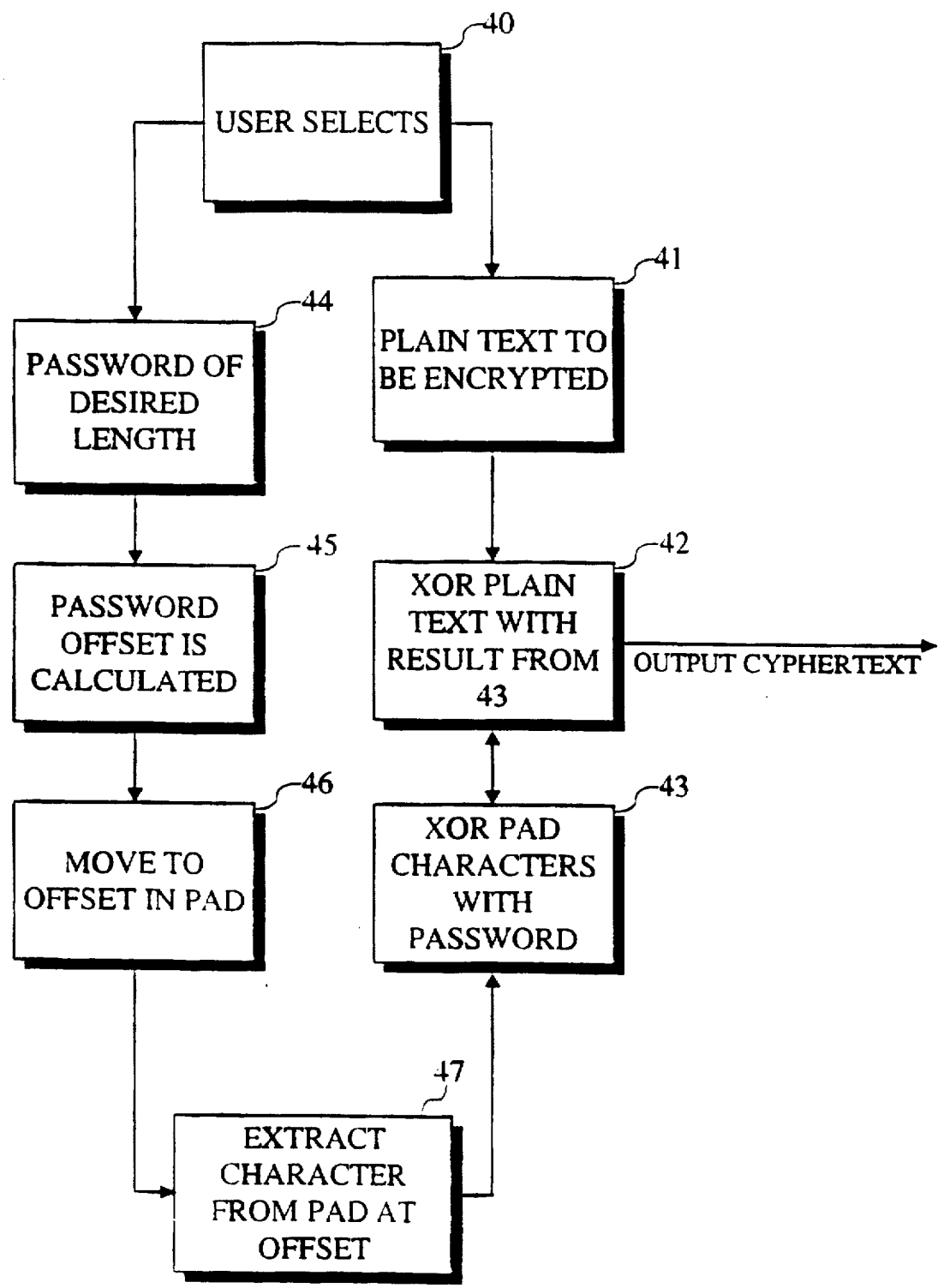
FIG. 4 is a flow diagram of a method according to the present invention, showing user selection of plain text and a password for encryption, and calculation of a pad offset for establishing character correspondence between plain text and pad prior to XORing to determine ciphertext.

FIG. 4 is a flow diagram of a method according to the present invention, showing user selection 40 of plain text and a password for encryption. FIG. 4 further shows calculation of an offset from the selected password for establishing character correspondence between plain text and pad prior to XORing 42 (byte-sized, according to one embodiment of the present invention) plain text characters, to generate desired output ciphertext. The offset is significant, because the plain text is a file of sequential characters. Similarly, the pad is a sequential grouping of bits or characters. According to the present invention, an initial offset is established by establishing a correspondence at an initial offset value of the pad sequence which will be XORed with the first character of the plain text. According to the present invention, a user selects 40 plain text to be encrypted 41 and selects 44 a password of desired length. According to one embodiment of the present invention, a five character password is selected.

According to one embodiment of the present invention, selecting 41 plain text to be encrypted includes or is followed by compressing the plain text by a selected compression technique. Many compression techniques are well-known. Some of these are commercially available. Any one of these may be used in connection with the present invention. Alternatively, compression can be applied to the output ciphertext, within the meaning of the present invention.

Next in FIG. 4, the user XORs 42 particular characters, i.e., bytes, of the selected plain text with corresponding pad characters or pad derivative (e.g., the pad XORed with a password) characters. The pad characters XORed are taken from a pad of selected relative size (compared to the size of the plain text being XORed) at a determined pad character offset. The result of XORing the offset pad characters with corresponding plain text characters is to produce output cipher text.

According to one embodiment of the invention, the offset at which pad characters are taken for XORing with corresponding plain text, can be determined by selecting a password which may have five characters, for example, and programming 44 the selected password by combination with a randomly determined pad. The offset is determined 45 with reference to the selected password.

An example of how to determine the offset from a selected password is according to the following code:

char code;
int offset;
int y;
for (y=0; y<5;y++) do
offset +=*(code+y);

The character of the pad to be selected in accordance with the offset is identified by moving 46 a pointer for example to the location of the next character in the pad. Next, the character of the pad identified with reference to the offset is extracted 47 and then XORed with the password 43. Finally, the result of XOR logical combination 43 is XORed with corresponding plain text 42 to produce output ciphertext.

If the plain text is larger in number of characters than the pad, the pad is reused at a redetermined offset for XORing the not yet enciphered portions of the plain text. According to one embodiment of the present invention, the offset is a function of a user selected password. According to one embodiment of the present invention, the pad includes the user selected password or a derivative thereof.

According to the present invention, a pad is created with a software program stored on a selected memory medium on which space is reserved for storage of the pad created. Once the pad is created, it is stored at the reserved space. According to one embodiment of the present invention, the pad is additionally stored at another location for security. According to one embodiment of the present invention, the pad is stored on a flash card. According to one embodiment of the present invention, the software program is stored on a floppy disk. According to one embodiment of the present invention, the pad is stored at a reserved space on the floppy disk. According to one embodiment of the present invention, the software program is installed on a hard disk. According to one embodiment of the present invention, the pad is created by the software program with a seed file located on a hard disk drive, i.e., a hard drive.

Figure 5:
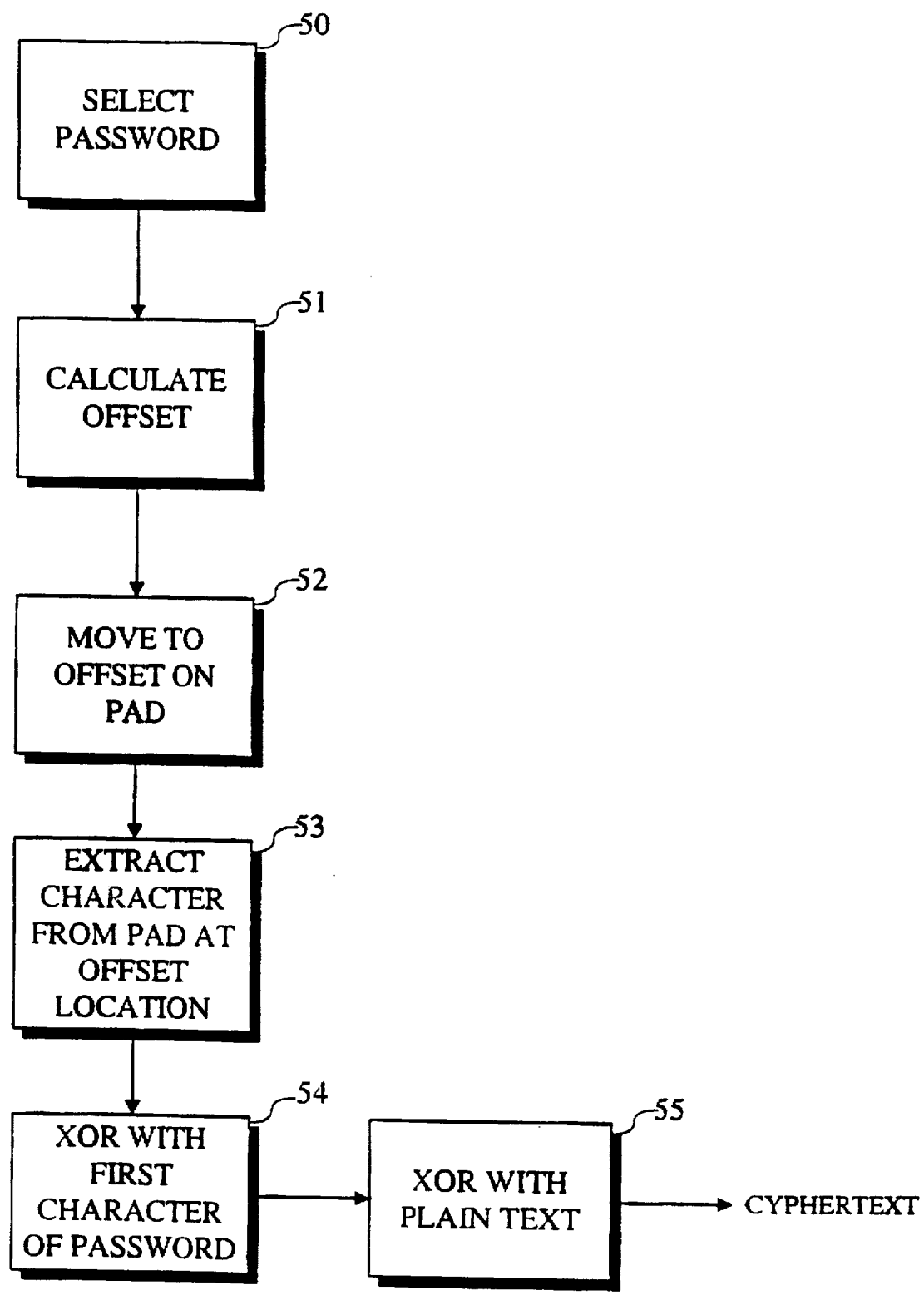
FIG. 5 is a flow diagram of a method according to the present invention, showing creation of ciphertext by XORing with the result of a pad XORed at an offset location with a selected password, the offset itself being a function of the selected password.

FIG. 5 is a flow diagram of a method according to the present invention, showing creation of ciphertext by XORing with the result of a pad XORed at an offset location with a selected password, the offset itself being a function of the selected password. In particular, a password is selected 50. Next, an offset is calculated 51 or otherwise determined. A move is then made 52 to the offset determined location. Then, the character of the pad at the offset location is extracted 53. The particular pad character is XORed 54 with the first character of the password, to produce a result, which in turn is XORed 55 with corresponding characters of plain text to produce ciphertext.

For purposes of the present invention, random is defined as an unpatterned, probabilistically unbiased sequence greater than or equal to one of elements (preferably bits, but for example also characters or numbers). Pseudo random means substantially but not completely random, for example but not limited to 99 percent random. By definition, a computer generated number is considered to be pseudo random.

Appendix A, below provides an example of C++ code according to an embodiment of the present invention.

APPENDIX A.

PROGRAM CODE:

THE SWAPCRYPT INITIALIZATION PROGRAM FOLLOWS.

This program prompts the user to supply a seed file located on their computer, according to one embodiment of the present invention. This seed file is used in conjunction with a pseudo-random generator to produce a pad key that is written into the data segment of a SwapCrypt program file, according to an embodiment of the present invention. Pseudo-random generators may typically not produce an adequate level of randomness for use in cryptography; therefore this program combines the output of a pseudo-random generator with a user supplied or selected seed file. The result is an output pad that exhibits superior randomness adequate to anchor a cryptographic stream cipher. Secondarily, this program allows the user to set a multi-character sign-on password for the SwapCrypt program. The sign-on password is encrypted into the data segment of the SwapCrypt program file, according to an embodiment of the present invention. A pseudo-random generator supplies material that is used to encrypt the sign-on password into a specific version of the SwapCrypt program.

```
//==============================================================
//*** This program initializes the SwapCrypt executable by writing data directly
// to the SwapCrypt file.

#include <stdio.h>
#include <stdlib.h>
#include <conio.h>
#include <string.h>
#include <time.h>
#include <dos.h>
#include <dir.h>
#include <bios.h>
#include <direct.h>
#include <alloc.h>
#include <process.h>
#define MUTATE 77472L
#define WIPE 97528L
#define NOWAY 97530L
#define PASSWRD 97582L
define PASCRPT 97592L //==============================================================
//*** Globals char defaultpth[128];
int defaultdrv;
int curs = 1;
extern int _wscroll = 0;        // hold the screen from scrolling
char pswd[9];

//==============================================================
//*** Function prototypes void idiot();
void badfile();
void initit(FILE *fp, char *padfile);
void noway();
```

```
char *wrkfile(int typ, int bkgrdclr, int hghclr, int lowclr, int frclr, int bkclr, int txclr);
void showscrn(int flg);
void curoff();
void curon();
int getfile(char *temp, int typ, int hghclr, int lowclr, int frclr, int bkclr, int txclr);
void sort(char *ptr[], int fg);
int scrlmenu(char *ptr[], int fg, int a, int b, int c, int d, int typ, int hghclr, int lowclr, int
frclr, int bkclr, int txclr);
void menudraw(char *ptr[], int a, int b, int c, int d, int z);
void menudo(char *ptr[], int a, int b, int c, int d, int z, int count, int hghclr, int lowclr, int
bkclr, int txclr);
void blank();
void box(int tr, int br, int ls, int rs, int typ);
int getkey();
void cgdrv();
int edit(int fg, int lm, char *text);
void openscrn();
int password();
int flecpy();
void goodbye();
void ouch(int oops);
void pcmcia();
void message(char *msg);

//=====================================================================
=============
//*** Function main void main()
{
    int x;
    FILE *fp;
    char temp;
    char buf[11];
    char buffer[128];
    char mutate[] = "1234567890";
    char args[2][2];

defaultdrv = getdisk();
    strcpy(defaultpth, "X:\\");
    defaultpth[0] = 'A' + getdisk();
    getcurdir(0, defaultpth + 3);

clrscr();
    sprintf(buffer, "COPY SWAPCRPT.DST SWAPCRPT.EXE");
        if(system(buffer) == - 1)
            idiot();
```

```
if (!flecpy())          // call function to copy DLL and HLP files
    goodbye();
if ((fp = fopen("SWAPCRPT.EXE", "r+b")) == NULL)
    idiot();
fseek(fp, MUTATE, SEEK_SET);    // file offset for encrypt array
fread(&buf, sizeof(char), 11, fp);
if (strcmp(mutate, buf) == 0)
{
    openscrn();
    strcpy(buffer, wrkfile(2, 1, 14, 0, 14, 7, 0));
    if (*(buffer + 0))
    {
        message("Please wait, initializing key.");
```

The following line of code calls the pad key initialization function: initit

```
        initit(fp, buffer);     // initialize the array
        fseek(fp, WIPE, SEEK_SET);    // offset for wipe level is triple
        fwrite("A", sizeof(char), 1, fp);
```

The following code fragment writes the sign-on password and password encryption string into the SwapCrypt program file's data segment.

```
        if(password())
        {
            fseek(fp, PASCRPT, SEEK_SET);   // offset for passcrypt
            randomize();
            for(x = 0; x < 8; x++)
            {
                temp = random(255) + 1;
                *(pswd + x) = *(pswd + x) ^ temp;
                fwrite(&temp, sizeof(char), 1, fp);
            }
            fseek(fp, PASSWRD, SEEK_SET);   // offset for password
            fwrite(&pswd, strlen(pswd), 1, fp);
        }
    fclose(fp);
    pcmcia();               // install to PCMCIA flash card
    message("Please wait, initializing SwapCrypt card.");
    strcpy (buffer, "SCFRMT");
    strcpy (args[0],"/Q");
    strcpy (args[1],"/N");

if((x = spawnlp (P_WAIT, buffer, buffer, args[0], args[1], NULL)) != 0)
        ouch(x);
    else
    {
```

```
                    textcolor(7);
                    textbackground(0);
                    curon();
                    clrscr();
                    printf("SwapCrypt card has been successfully initialized and is now
ready to be\n");
                    printf("used. Remember, total security depends on how well you secure
your SwapCrypt\n");
                    printf("card.\n\n");
                }
            }
            else
            {
                textcolor(7);
                textbackground(0);
                curon();
                clrscr();
            }
        }
        else
            noway();
        fclose(fp);
        printf("\n\r");
        setdisk(defaultdrv);
        chdir(defaultpth);
    }
```

//=========================================================================
============
//*** function flecpy: copy the compression DLL and help files to the Windows
subdirectory

```
int flecpy()
{
    int x;
    char *stuff = new char[126];
    char *ptr;
    char buffer[128];

textcolor(15);
    textbackground(1);
    clrscr();
    gotoxy(1, 2);
    cprintf("           %c%c%c%c  S w a p C r y p t (tm)  %c%c%c%c", 240, 240,
240, 240, 240, 240, 240,    240);
    cprintf("\r\n\n\n  COPY WINDOWS FILES:\r\n\n");
```

```
    cprintf("   SwapCrypt needs to copy two files, COMPPLUS.DLL and
SWAPCPRT.HLP, into\r\n");
    cprintf("   the Windows directory on your hard drive. Please verify, and edit if\r\n");
    cprintf("   necessary, the location where Windows is installed on your hard
drive.\r\n\n");
    cprintf("   Press ENTER to continue or ESC to abort.\r\n\n");

textcolor(12);
box(15, 19, 20, 60, 1);
textcolor(14);
gotoxy(23, 17);
curon();
cprintf("Windows directory: ");
ptr = buffer;
ptr++;
strcpy(stuff, "C:\\WINDOWS");
x = edit(5, 17, stuff);
strcpy(buffer, stuff);
if (x == -1)
{
        delete stuff;
        return 0;
}
strupr(buffer);
x = strlen(buffer);
if(*(buffer + x - 1) == 92)
        *(buffer + x - 1) = NULL;
x = buffer[0] - 65;
if((x = setdisk(x)) == -1)
{
        delete stuff;
        return 0;
}
if((x = chdir(buffer)) == -1)
{
        delete stuff;
        return 0;
}
setdisk(defaultdrv);
chdir(defaultpth);
textbackground(0);
clrscr();
sprintf(stuff, "COPY COMPPLUS.DLL %s", buffer);
if(system(stuff) == -1)
        return 0;
sprintf(stuff, "COPY SWAPCRPT.HLP %s", buffer);
if(system(stuff) == -1)
```

```
      return 0;
   delete stuff;
   return 1;
}

//========================================================================
//============
//*** function pcmcia: Note to confirm PCMCIA card is in place and ready for write.

void pcmcia()
{
   setdisk(defaultdrv);
   chdir(defaultpth);
   textcolor(15);
   textbackground(1);
   clrscr();
   gotoxy(1, 2);
   cprintf("              %c%c%c%c  S w a p C r y p t (tm) %c%c%c%c", 240, 240,
240, 240, 240, 240, 240, 240);
   cprintf("\r\n\n\n  SwapCrypt INITIALIZATION:\r\n\n");
   cprintf("    This final step will install the encryption key onto your SwapCrypt\r\n");
   cprintf("    card.\r\n\n\n");
   cprintf("  Press any key to continue.");
   curoff();
   getch();
}

//========================================================================
//============
//*** function openscrn: say hello and give the user initial instructions.

void openscrn()
{
   char key = 65;
   textcolor(15);
   textbackground(1);
   clrscr();
   gotoxy(1, 2);
   cprintf("              %c%c%c%c  S w a p C r y p t (tm) %c%c%c%c", 240, 240,
240, 240, 240, 240, 240, 240);
   cprintf("\r\n\n\n  INITIALIZATION:\r\n\n");
   cprintf("    You must now select a pad file to initialize the encryption key for\r\n");
   cprintf("    SwapCrypt. Your choice of pad file is critical. Instructions for\r\n");
   cprintf("    selecting an appropriate pad file are contained in the file\r\n");
   cprintf("    README!.TXT.\r\n\n\n");
   cprintf("  Press ENTER to continue, ESC to exit now.");
   curoff();
```

```
    while(key != 13 && key != 27)
        key = getch();
    if(key == 27)
    {
        curon();
        textbackground(0);
        textcolor(7);
        clrscr();
        exit(1);
    }
}

//================================================================
============
//*** function password: Set the eight character sign-on password.

int password()
{
    int x;
    char *stuff = new char[10];

textcolor(15);
    textbackground(1);
    clrscr();
    gotoxy(1, 2);
    cprintf("            %c%c%c%c  S w a p C r y p t (tm)  %c%c%c%c", 240, 240,
240, 240, 240, 240, 240, 240);
    cprintf("\r\n\n\n SIGN-ON PASSWORD:\r\n\n");
    cprintf("    You are about to set a sign-on password. Press ESC now to skip this\r\n");
    cprintf("    operation. Once this feature has been activated it cannot be disabled!\r\n");
    cprintf("    If set, SwapCrypt will require this password in order to run. You may\r\n");
    cprintf("    skip setting this password if you wish.\r\n\n");
    cprintf("    All alphanumeric characters are valid and case sensitive.\r\n");
    cprintf("    Enter an EIGHT character password and press Enter.");

textcolor(12);
    box(17, 21, 20, 60, 1);
    textcolor(14);
    gotoxy(23, 19);
    curon();
    cprintf("Enter your password: ");
    while (strlen(pswd) != 8)
    {
        *(stuff + 0) = NULL;
        x = edit(5, 8, stuff);
        strcpy(pswd, stuff);
        if (x == -1)
```

```
          {
             delete stuff;
             return 0;
          }
          if (strlen(pswd) != 8)
          {
             gotoxy(44, 19);
             cprintf("        ");
             gotoxy(44, 19);
             putch(7);
          }
       }
       delete stuff;
       return 1;
}
```

//=========================================================
============
//*** function idiot: The distribution copy of SwapCrypt is not there!

```
void idiot()
{
   putch(7);
   printf("ERROR! Could not find or open the files SWAPCRPT.DST or
SWAPCRPT.EXE");
   exit(1);
}
```

//=========================================================
============
//*** function goodbye: Fatal error -- Windows installation path not found.

```
void goodbye()
{
   textcolor(7);
   textbackground(0);
   curon();
   clrscr();
   putch(7);
   printf("ERROR. Windows path not found.");
   exit(1);
}
```

//=========================================================
============
//*** function message: Display a message on screen

```c
void message(char *msg)
{
int x;
curoff();
textcolor(12);
textbackground(1);
box(14, 18, 15, 65, 1);
for(x = 15; x < 18; x++)
{
   gotoxy(16, x);
   cprintf("                              ");
}
gotoxy(20, 16);
textcolor(14);
cprintf("%s", msg);
}

//=========================================================================
// function ouch: Problems with the PCMCIA card.

void ouch(int oops)
{
   curon();
   textbackground(0);
   clrscr();
   switch(oops)
   {
   case 0xffff:
        printf ("\n SCFRMT.EXE not found\n");
        break;
   case 1:
        printf ("\n Invalid command line parameter. \n");
        break;
   case 2:
        printf ("\n Quit without formatting. \n");
        break;
   case 10:
        printf ("\n Write error. \n");
        break;
   case 11:
        printf ("\n No MemoryCard Driver found. \n");
        break;
   case 12:
        printf ("\n No MemoryCard found. \n");
        break;
   case 13:
```

```
            printf ("\n MemoryCard write protected / read only. \n");
            break;
        case 15:
            printf ("\n Error. Insufficient memory. \n");
            break;
        case 17:
            printf ("\n Error on open transfer file. \n");
            break;
        case 19:
            printf ("\n Erase error. \n");
            break;
        case 28:
            printf ("\n No Flash MemoryCard found. \n");
            break;
        default:
            printf ("\n Unknown error (%x) occured\n", oops);
            break;
    }
}

//=========================================================================
//*** function badfile: User pad file won't open for unknown reasons.

void badfile()
{
    textcolor(7);
    textbackground(0);
    curon();
    clrscr();
    putch(7);
    printf("ERROR! Could not find or open the pad file.");
    exit(1);
}

//=========================================================================
//*** function noway: this is a working copy of file. re-initit prohibited!

void noway()
{
    putch(7);
    printf("ERROR! This copy of SwapCrypt has already been initialized. You may only\n");
    printf("initialize a distribution copy of the SwapCrypt program file. Refer to\n");
    printf("the file README!.NOW for detailed instructions.");
}
```

The following function reads the information in the user supplied seed file and combines that information with the output of a pseudo-random number generator writing the result to the pad key in the data segment of the SwapCrypt program file. This function also writes a random test string to the SwapCrypt program file. This test string is used to check the validity of the password for the encrypted document.

//===========================================================================

//*** *function initit: This is the function that creates and writes the pad key into the SwapCrypt EXE.*

```
void initit(FILE *fp, char *padfile)
{
    FILE *pad;
    char crypt, check = 0;
    int x;
    union twist
    {
        unsigned int num;
        char byte[2];
    }item;

if ((pad = fopen(padfile, "rb")) == NULL)
        badfile();
```

The following line of code sets the position in the SwapCrypt program file for writing the file password test string.

```
    fseek(fp, NOWAY, SEEK_SET);    // file offset for faulty passwrd chk
```

The following for loop reads data from the user supplied seed file and combines that data with the output of a pseudo-random number generator to produce the 50 character file password test string. The file password test string is written to the SwapCrypt program file in this loop.

```
    randomize();
    for (x = 1; x < 50; x++)
    {
```

The variable crypt is used to retrieve characters (one at a time) from the user supplied seed file. The following do loop checks each character selected with the preceding character selected. A character match aborts the current selection and another is made until the preceding character and the present selection are different.

```
        do
        {
            fread(&crypt, sizeof(char), 1, pad);
            if (feof(pad))
```

```
        {
            rewind(pad);
            fread(&crypt, sizeof(char), 1, pad);
        }
    }
    while (crypt == check);              //character must be different than
previous char
        check = crypt;                   //store character in check for next
iteration
        item.num = random(32767) + 1;    //produce pseudo-random character
        crypt = crypt ^ item.byte[0];    //XOR seed file character with pseudo-
random char
        if(crypt)                        //do not accept NULL as a result
            fwrite(&crypt, sizeof(char), 1, fp);   //write character to SwapCrypt file
        else
            x--;
}
```

The following line of code sets the position in the SwapCrypt program file for writing the pad key encryption array.

```
fseek(fp, MUTATE, SEEK_SET);    // file offset for encrypt array
```

The following for loop reads data from the user supplied seed file and combines that data with the output of a pseudo-random number generator to produce the 20000 character pad key encryption array. The pad key encryption array is written to the SwapCrypt program file in this loop.

```
for (x = 1; x < 20000; x++)
{
```

The variable crypt is used to retrieve characters (one at a time) from the user supplied seed file. The following do loop checks each character selected against the preceding character selected. A character match aborts the current selection and another is made until the preceding character and the present selection are different.

```
    do
    {
        fread(&crypt, sizeof(char), 1, pad);
        if (feof(pad))
        {
            rewind(pad);
            fread(&crypt, sizeof(char), 1, pad);
        }
    }
    while (crypt == check);              //character must be different than
previous char
        check = crypt;                   //store character in check for next
iteration
```

```
            item.num = random(32767) + 1;        //produce pseudo-random character
            crypt = crypt ^ item.byte[0];        //XOR seed file character with pseudo-
random char
            if(crypt)                            //do not accept NULL as a result
                fwrite(&crypt, sizeof(char), 1, fp);   //write character to SwapCrypt file
            else
                x--;
```

The following cascade of ifs re-seeds the pseudo-random generator from the system clock. This action produces a new sequence of pseudo-random numbers every 1500 characters.

```
            if (x == 1500) randomize();
            if (x == 3000) randomize();
            if (x == 4500) randomize();
            if (x == 6000) randomize();
            if (x == 7500) randomize();
            if (x == 10000) randomize();
            if (x == 11500) randomize();
            if (x == 13000) randomize();
            if (x == 14500) randomize();
            if (x == 16000) randomize();
            if (x == 17500) randomize();
        }
}

//=========================================================================
//*** function wrkfile: get file and path to work on the integer arguments
//*** are as follows ==> typ:      the box line type
//***              ==> bkgrdclr: the overall screen color
//***              ==> highclr:  the text color of the highlight bar &
//***                            path label
//***              ==> lowclr:   the background color of highlight bar
//***              ==> frclr:    foreground color of box
//***              ==> bkclr:    background color of box
//***              ==> txclr:    color of text inside box char *wrkfile(int typ, int bkgrdclr, int hghclr, int lowclr, int frclr, int bkclr, int txclr)
{
    int x = 1;
    char buf[128];
    char fname[128];
    char *gotptr;
    while (x)                   // for-ever
    {
        *(fname + 0) = NULL;
        window(1, 1, 80, 25);
        showscrn(1);
```

```
        window(1, 3, 80, 23);
        textbackground(bkgrdclr);
        clrscr();
        curoff();
//::::::::::::::::::::::::::::::::::::::::::::::::::::::::::::::::
//cprintf("Coreleft is: %lu bytes\n", (unsigned long) coreleft());
//::::::::::::::::::::::::::::::::::::::::::::::::::::::::::::::::
        while (x = getfile(fname, typ, hghclr, lowclr, frclr, bkclr, txclr))
            if (x)              // user picked directory
            {
                *(buf + 0) = NULL;
                strcpy(buf, fname);// fname holds new dir
                chdir(buf);     // change directory
                textbackground(bkgrdclr);
                window(1, 1, 80, 25);
                showscrn(1);
                window(1, 3, 80, 23);
                textbackground(bkgrdclr);
                clrscr();
            }
    }
    curon();
    window(1, 1, 80, 25);
    gotptr = fname;
    return gotptr;
}

//================================================================
============
//*** function showscrn: opening screen
void showscrn(int flg)
{
    int x;
    textcolor(0);
    textbackground(7);
    clrscr();
    gotoxy(1, 2);
    cprintf("            %c%c%c%c  S w a p C r y p t (tm)  %c%c%c%c", 240, 240,
240, 240, 240, 240, 240, 240);

switch (flg)
    {
        case 1:
        gotoxy(12, 24);
        cprintf("[F10] change drive    %c%c%c%c select       [Esc] quit ", 17, 196,
196, 217);
        break;
```

```
    }
    textcolor(7);
    for (x = 1; x < 81; x++)
    {
        gotoxy(x, 1);
        cprintf("%c", 223);
        gotoxy(x, 25);
        cprintf("%c", 220);
    }
}

//===========================================================================
//*** function cursor off: turns the damn cursor off!

void curoff()
{
    static union REGS inregs, outregs;
    if (curs)
    {
        inregs.h.ah = 1;          // load registers
        inregs.h.ch = 0x20;
        inregs.h.cl = 0;
        int86(0x10, &inregs, &outregs);
        // DOS call turns cursor off
        curs = 0;                 // set cursor flag
    }
}

//===========================================================================
//*** function cursor on: turns the cursor back on void curon()
{
    static union REGS inregs, outregs;
    if (!curs)
    {
        inregs.h.ah = 1;          // load registers
        inregs.h.ch = 6;          // !! will need to adjust this to
        inregs.h.cl = 7;          // handle color and mono monitors !!
        int86(0x10, &inregs, &outregs);
        // DOS call turn cursor on
        curs = 1;                 // set cursor flag
    }
}
```

```
//===============================================================
============
//*** function get file: get files in current directory int getfile(char *temp, int typ, int hghclr, int lowclr, int frclr, int bkclr, int txclr)
{
    struct ffblk ffblk;         // structure to hold file data
    int done, z, y = 0, x = 0;  // counters
    char path[128];
    char buffer [25];           // string to hold selected file name
    char **array = new char *[1000]; // read up to 1000 files in directory

*(buffer + 0) = NULL;
    curoff();
    x = 0;
    done = findfirst("*.*", &ffblk, FA_DIREC);
    // find first file in path
    while (!done)               // loop to read in rest of files
    {
        if (ffblk.ff_attrib == 16)
        {
            if (strcmp(ffblk.ff_name, ".") != 0)
            {
                *(array + x) = new char [strlen(ffblk.ff_name) + 2];
                sprintf(buffer, "\\%s\0", ffblk.ff_name);
                strcpy(*(array + x), buffer);
                // put files into array
            }
            else
                x--;
        }
        else
        {
            if (ffblk.ff_fsize > 20999)
            {
                *(array + x) = new char [28];
                sprintf(buffer, "%-12s  %9lu\0", ffblk.ff_name, ffblk.ff_fsize);
                strcpy(*(array + x), buffer);
                // put files into array
            }
            else
                x--;
        }
        done = findnext(&ffblk);
        x++;
    }
    if (x)
```

```
{
    sort(array, x);         // sort the file list if (x + 2 < 17)         // dynamically size file display box
        done = x + 3;
    else
        done = 17;

strcpy(path, "X:\\");
    // fill string with form of response: X:\
    path[0] = 'A' + getdisk();  // replace X with current drive letter
    getcurdir(0, path + 3);
    // fill rest of string with current directory
    textcolor(hghclr);
    gotoxy(7, done + 3);
    //printf("heap left: %lu bytes\n", farcoreleft());
    cprintf("Path %c%c%c %s", 196, 196, 16, path);
    gotoxy(41, 3);
    cprintf("%c%c%c select an initialization pad file", 17, 196, 196);
    y = scrlmenu(array, x, 2, done, 2, 35, typ, hghclr, lowclr, frclr, bkclr, txclr);
    // call scroll box and get file if (y == - 1)           // user pressed Esc ÄÄ abort and exit
    {
        *(temp + 0) = NULL;
        return 0;           // end program
    } if (y > - 1)
    {
        strcpy(buffer, *(array + y));
        *(strstr(buffer, " ") + 0) = NULL;
        // file to open is in buffer
        if (*(path + strlen(path) - 1) == 92)
            *(path + strlen(path) - 1) = NULL;

if (*(buffer + 0) == 92)
            sprintf(temp, "%s%s", path, buffer);
        else
            sprintf(temp, "%s\\%s", path, buffer);
    }
}
else
{
    blank();
    y = - 2;
}
```

```
    for (z = 0; z < x; z++)        // deallocate heap
        delete *(array + z);
    delete array;
    // by temp
    if (y == - 2)                  // need to refresh display
    {
        done = 1;
        *(temp + 0) = NULL;
    }
    else
        if (*(buffer + 0) == 92) done = 1; else done = 0;

return done;
}

//================================================================
=============
//*** Function sort: a standard shell sort algorithm. array is pointer array
//*** to strings, fg is the count.
//*** NOTE! strings in the array better be null terminated!

void sort(char *ptr[], int fg)
{
    int x = 2;
    int y = fg;
    int z;
    int t;
    int done;
    char *temp1;

x = fg / 2;
    while (x >= 1)
    {
        for (y = 0; y < x; y++)
        {
            for (z = y; z < (fg - x); z += x)
            {
                t = z;
                temp1 = *(ptr + (z + x));
                done = 0;
                while (t >= y && done == 0)
                {
                    if (strcmp(temp1, *(ptr + t)) > 0)
                        done = 1;
                    else
                    {
```

31

```
                        *(ptr + (t + x)) = *(ptr + t);
                        t -= x;
                    }
                }
                *(ptr + (t + x)) = temp1;
            }
        }
        x = x / 2;
    }
}

//================================================================
//============
//*** function scrlmenu: draws a box on screen, displays the menu selections,
//*** and allows the user to scroll through and make a selection. the var
//*** fg is the number of items in the array and the vars a thru d are the
//*** screen coordinates for the menu box. This function calls the functions
//*** getkey(), curon(), curoff(), menudo(), and menudraw()

int scrlmenu(char *ptr[], int fg, int a, int b, int c, int d, int typ, int hghclr, int lowclr, int
frclr, int bkclr, int txclr)
{
    int pd;              // loop control flag
    char kbd;            // user keypress
    int z = 0;           // offset counter
    int count = 0;       // menu counter
    int code = 0;        // keyboard scan code
    int util;            // utilities choice
    char buffer[60];     // hold system command line
    union scan           // union to hold keyboard scan code
    {
        int c;
        char ch[2];
    } sc;

curoff();            // turn cursor off
    textcolor(frclr);
    textbackground(bkclr);
    box(a, b, c, d, typ);     // draw a box for the menu
    textcolor(0);
    menudraw(ptr, a, b, c, d, z);    // draw the menu items
    menudo(ptr, a, b, c, d, z, count, hghclr, lowclr, bkclr, txclr);

pd = 1;              // loop control flag
    while (pd)           // loop allows user to move selection
    {
        while (kbhit() == 0);     // holding loop waits for key press
```

32

```
sc.c = getkey();           // get the keyboard scan code
if (*(sc.ch + 0) == 0)     // this is a function or cursor key
{
    code = 1;              // set scan code flag
    kbd = *(sc.ch + 1);    // read in key press value
}
else                       // this is an alphanumeric key
{
    code = 0;              // set scan code flag
    kbd = *(sc.ch + 0);    // read in key press value
} if (code)                  // user pressed non-alpha key
{
    switch (kbd)
    {
        case 72:           // user pressed up arrow
        --count;           // decrement menu counter
        if (count < 0)     // already at top
        {
            count = fg - 1;
            // roll over to bottom
            if (fg > (b - a) - 1)
                // this mess allows
            {
                // for the possibility
                if (fg >= (b - a - 1) * 2)
                {
                    z = (b - a - 1);
                    // that the menu items
                    z += (fg - (z * 2));
                    // number more or less
                }          // than will fit box
                else
                    z = fg - (b - a - 1);
            }
            else
                z = 0;
            menudo(ptr, a, b, c, d, z, count, hghclr, lowclr, bkclr, txclr);
            // place highlight
        }
        else               // not yet at top so move up one
        {
            if (wherey() == a + 1)
                z -= 1;
            if (z < 0)
```

```
                            z = 0;
                            menudo(ptr, a, b, c, d, z, count, hghclr, lowclr, bkclr, txclr);
                            // place highlight
                    }
                    break;
                    case 80:        // user pressed down arrow
                    ++count;        // increment menu counter
                    if (count == fg)   // already at bottom of list
                    {
                            count = 0;   // roll over to top
                            z = 0;
                            menudo(ptr, a, b, c, d, z, count, hghclr, lowclr, bkclr, txclr);
                            // place highlight
                    }
                    else            // not yet at bottom of list
                    {
                            if (wherey() == b - 1)
                                    z += 1;
                    menudo(ptr, a, b, c, d, z, count, hghclr, lowclr, bkclr, txclr);
                    // place highlight
                    }
                    break;
                    //case 67:
                    //return - 2;
                    case 68:
                    cgdrv();
                    return - 2;
            }
    }
    else                    // user pressed alph-numeric
        switch (kbd)
        {
                case 13:        // user pressed Enter
                if (ptr[count][0] == 4)
                {
                    for (util = 0; util < strlen(*(ptr + count)) - 2; util++)
                            ptr[count][util] = ptr[count][util + 2];
                            ptr[count][util] = NULL;
                }
                pd = 0;         // set exit
                break;
                case 27:        // user pressed Esc
                pd = 0;         // set loop control to exit
                fg = - 1;       // set return flag to abort
                break;
                case 32:
                if (c == 35)
```

```
        break;
    if (ptr[count][0] == 4)
    {
        for (util = 0; util < strlen(*(ptr + count)) - 2; util++)
            ptr[count][util] = ptr[count][util + 2];
        ptr[count][util] = NULL;
    }
    else
    {
        if (*(ptr + count)[0] != 92)
            {
            sprintf(buffer, "%c %s", 4, *(ptr + count));
            strcpy(*(ptr + count), buffer);
            }
        else
            putch(7);
    }
    gotoxy(7, wherey());
    textcolor(15);   // set highlight bar color
    textbackground(7);
    cprintf(" %s", *(ptr + count));
    textcolor(7);    // put color back
    textbackground(0);

++count;         // increment menu counter
    if (count == fg)  // already at bottom of list
    {
        count = 0;   // roll over to top
        z = 0;
        menudo(ptr, a, b, c, d, z, count, hghclr, lowclr, bkclr, txclr);
            // place highlight
    }
    else        // not yet at bottom of list
    {
        if (wherey() == b - 1)
            z += 1;
        menudo(ptr, a, b, c, d, z, count, hghclr, lowclr, bkclr, txclr);
        // place highlight
    }
    break;
    default:      // process any alpha key to scroll box
    if (kbd > 96)
        kbd = kbd - 32;
    // all lower case
    for (code = 0; code <= fg; code++)
        // loop through array
    {
```

```
                    if (kbd == ptr[code][0])
                        // find first element
                    {
                                // where first letter
                        count = code;
                        // matches keypress
                        if (count > (b - a) - 2)
                            z = count - ((b - a) - 2);
                        else
                            z = 0;
                        menudo(ptr, a, b, c, d, z, count, hghclr, lowclr, bkclr, txclr);
                        // place mark
                        break;
                    }
                }
            break;
        }
    } if (fg > -1)
        fg = count;              // set return flag

//curon();
        return fg;               // return user selection
}

//=========================================================================
//============
//*** function menudraw: draws the items inside the menu box void menudraw(char *ptr[], int a, int b, int c, int d, int z)
{
    char temp[81];
    int offset;
    int q;
    int x;

for (x = z; x != z + ((b - a) - 1); ++x)
        // loop to draw in menu items
    {
        offset = (d - c - 5 - strlen(*(ptr + x)));

for (q = 0; q != offset; ++q)// loop to load temp with blanks
            *(temp + q) = 32;        // temp fills in the balance of
            *(temp + q) = '\0';      // the box with spaces gotoxy(c + 1, (a + 1) + x - z);
```

```
      cprintf("  %s%s", *(ptr + x), temp);
   }
}

//=====================================================================
============
//*** function menudo places the highlight on the menu selection void menudo(char *ptr[], int a, int b, int c, int d, int z, int count, int hghclr, int lowclr, int
bkclr, int txclr)
{
   char temp[81];
   int x;
   int offset = (d - c - 5 - strlen(*(ptr + count)));

menudraw(ptr, a, b, c, d, z);    // 1st re-draw menu items for (x = 0; x != offset; ++x)    // loop to load temp with blanks
      *(temp + x) = 32;
   *(temp + x) = '\0';

textcolor(hghclr);         // set highlight bar color
   textbackground(lowclr);
   gotoxy(c + 1, (a + 1) + count - z);
   // draw highlighted choice
   cprintf("  %s%s", *(ptr + count), temp);
   textcolor(txclr);          // put color back
   textbackground(bkclr);
}

//=====================================================================
============
//*** function blank:

void blank()
{
   int x;
   char *stuff = new char[10];

textcolor(11);
   textbackground(3);
   box(10, 16, 40, 76, 2);
   for (x = 11; x < 16; x++)
   {
      gotoxy(41, x);
      cprintf("                        ");
   }
```

37

```
textcolor(15);
gotoxy(42, 12);
cprintf("Disk is empty.");
gotoxy(42, 14);
cprintf("Enter the new drive letter: ");

curon();
*(stuff + 0) = NULL;
x = edit(5, 1, stuff);
curoff();

if (x == 2)
{
    if (*(stuff + 0) > 96)
        *(stuff + 0) = *(stuff + 0) - 32;
    x = *(stuff + 0);
    x -= 64;
    if (_chdrive(x) == - 1)
        putch(7);
}
delete stuff;
}

//================================================================
===========
//*** function box: draw a double line box on the screen
//*** the four intergers are the coordinates of the four corners.
//*** tr = top row ÄÄ br = bottom row ÄÄ ls = left side ÄÄ rs = right side void box(int tr, int br, int ls, int rs, int typ)
{
    int x;
    unsigned char lftop;
    unsigned char rgtop;
    unsigned char lfbtm;
    unsigned char rgbtm;
    unsigned char hzlin;
    unsigned char vtlin;

switch (typ)
    {
        case 1:            // double line box
        lftop = 201;
        rgtop = 187;
        lfbtm = 200;
        rgbtm = 188;
        hzlin = 205;
```

```
            vtlin = 186;
            break;
        case 2:
            lftop = 218;
            rgtop = 191;
            lfbtm = 192;
            rgbtm = 217;
              hzlin = 196;
            vtlin = 179;
            break;
        case 3:
            lftop = 214;
            rgtop = 183;
            lfbtm = 211;
            rgbtm = 189;
            hzlin = 196;
            vtlin = 186;
            break;
        case 4:
            lftop = 213;
            rgtop = 184;
            lfbtm = 212;
            rgbtm = 190;
            hzlin = 205;
            vtlin = 179;
            break;
    }
    gotoxy(ls, tr);            // draw in the box corners
    cprintf("%c", lftop);
    gotoxy(rs, tr);
    cprintf("%c", rgtop);
    gotoxy(ls, br);
    cprintf("%c", lfbtm);
    gotoxy(rs, br);
    cprintf("%c", rgbtm);

for (x = tr + 1; x <= br - 1; x++)// loop to draw in box sides
    {
        gotoxy(ls, x);
        cprintf("%c", vtlin);
        gotoxy(rs, x);
        cprintf("%c", vtlin);
    } for (x = ls + 1; x <= rs - 1; x++)// loop to draw in box top & bottom
    {
        gotoxy(x, tr);
```

```
            cprintf("%c", hzlin);
        gotoxy(x, br);
        cprintf("%c", hzlin);
    }
    textcolor(0);
    for (x = tr + 1; x <= br; x++)    // loop to draw in box shadow
    {
        gotoxy(rs + 1, x);
        cprintf("%c", 219);
    } for (x = ls + 1; x <= rs + 1; x++)// loop to draw in box shadow
    {
        gotoxy(x, br + 1);
        cprintf("%c", 219);
    }
}

//===========================================================
============
//*** function getkey: use DOS interrupt to get keypress values int getkey()
{
    union REGS r;
    r.h.ah = 0;
    return int86(0x16, &r, &r);
}

//===========================================================
============
//*** function cgdrv: User wants to change the drive.

void cgdrv()
{
    int x;
    char *stuff = new char[10];

textcolor(11);
    textbackground(3);
    box(11, 15, 40, 75, 2);
    for (x = 12; x < 15; x++)
    {
        gotoxy(41, x);
        cprintf("                    ");
    }
    textcolor(15);
```

```
    gotoxy(42, 13);
    cprintf("Enter the new drive letter: ");

curon();
    *(stuff + 0) = NULL;
    x = edit(5, 1, stuff);
    curoff();

if (x == 2)
    {
        if (*(stuff + 0) > 96)
            *(stuff + 0) = *(stuff + 0) - 32;
        x = *(stuff + 0);
        x -= 64;
        if (_chdrive(x) == - 1)
            putch(7);
    } textbackground(7);
    for (x = 9; x < 16; x++)
    {
        gotoxy(38, x);
        cprintf("                    ");
    }
    textcolor(7);
    textbackground(0);
    delete stuff;
}

//================================================================
//============
//*** function edit: a single line text input function using three parameters.
//*** the variable fg can be used to both control the function when called as
//*** well as return a value for subsequent action. The variable lm sets the
//*** allowable length of the input string. The string text will display in the
//*** input field upon call as well as return the user's input data. (!! text
//*** is a pointer to a string.) This function requires the function getkey()

int edit(int fg, int lm, char *text)
{
    int r;              // anchored cursor position
    int q;              // limit counter
    int z;              // use as for loop counter
    int x;              // cursor position
    int y;              // cursor position
    int flg;            // internal string position
    int code = 1;       // scan code flag
```

```
char kbd;                    // key press value
char temp[128];              // temporary string buffer
int pd = 1;                  // initialize loop control variables
int ins = 1;                 // default with Ins on
union scan                   // union to hold keyboard scan code
{
   int c;
   char ch[2];
} sc;

r = wherex();                // constant for left cursor position
q = strlen(text);            // set limit counter from string sent
cprintf("%s", text);         // display any sent text
x = wherex();                // get the current cursor position
y = wherey();

do                           // main loop -- take input until exit
{
   gotoxy(x, y);
   while (kbhit() == 0);     // holding loop waits for key press sc.c = getkey();          // get the keyboard scan code
   if (*(sc.ch + 0) == 0)    // this is a function or cursor key
   {
       code = 0;             // set scan code flag
       kbd = *(sc.ch + 1);   // read in key press value
   }
   else                      // this is an alphanumeric key
   {
       code = 1;             // set scan code flag
       kbd = *(sc.ch + 0);   // read in key press value
   } if (code)                 // key is alpha-numeric or ESC/CR
   {
      switch (kbd)
      {
         case 27:            // user pressed ESC
            pd = 0;          // release loop
            fg = -1;         // set return flag
            break;

case 13:            // user pressed Enter
            pd = 0;          // release loop
            fg = 2;          // set return flag
            break;
```

```
case 8:         // user pressed bkspace
if (x > r)      // bkspace is valid
    {
    if (x < r + q)// !! in middle of string
    {
        code = (r + q) - x;
        // get position in string
        pd = 0;  // read string from cursor
        for (z = (q - code); z != q; z++)
            // to end & store
        {
            flg = *(text + z);
            // in temp string
            *(temp + pd) = flg;
            ++pd;
        }

*(temp + pd) = '\0';
        *(text + (q - code) - 1) = NULL;
        // remove end chr
        strcat(text, temp);
        // re-attach string end
                gotoxy(--x, y);
        cprintf("%s%c", temp, 32);
        // redraw screen
        --q;    // decrement strlen counter
        pd = 1; // put pd back after use!
    }
    else        // at end of the string
    {
        putch(8);// take care of display
        putch(32);
        putch(8);
        *(text + strlen(text) - 1) = NULL;
        // truncate string
        --q;    // decrement strlen counter
        --x;    // decrement cur positon
    }
}
break;

default:        // valid key press
    if (x < r + q)    // !! middle of string
{
    if (ins)    // Ins mode is on
    {
        if (q < lm)
```

43

```
                // limit is not reached
            {
                code = (r + q) - x;
                pd = 0;
                for (z = (q - code); z != q; ++z)
                {
                    flg = *(text + z);
                    *(temp + pd) = flg;
                    ++pd;
                }
                *(temp + pd) = '\0';
                // see bkspace
                *(text + (q - code)) = kbd;
                // process for
                *(text + (q - code) + 1) = '\0';
                        // notes on this
                strcat(text, temp);
                // section
                putch(kbd);
                cprintf("%s", temp);
                pd = 1;
                ++q;
                ++x;
            }
        }
        else        // Ins mode is off
        {
            code = (r + q) - x;
            pd = 0;
            for (z = (q - code + 1); z != q; ++z)
            {
                flg = *(text + z);
                *(temp + pd) = flg;
                ++pd;
            }       // see bkspace process
                    *(temp + pd) = '\0';
            // for notes
            *(text + (q - code)) = kbd;
            *(text + (q - code) + 1) = '\0';
            strcat(text, temp);
            putch(kbd);
            pd = 1;
            ++x;
        }
    }
    else        // at end of string
    {
```

44

```
            if (q < lm)
            {
                putch(kbd);
                sprintf(temp, "%s%c", text, kbd);
                // here's another
                strcpy(text, temp);
                // way to splice
                ++q;        // the ends of two
                        ++x;    // strings
            }
        }
    }
}
else                // function or cursor control key
{
    switch (kbd)
    {
        case 82:        // user toggled Ins
        if (ins)        // set Ins flag as indicated
            ins = 0;    // if on, turn off
        else
            ins = 1;    // if off, turn on
        break;
        case 72:        // user pressed up arrow
        if (fg < 5)
        {
            fg = 1;     // set return flag
            pd = 0;     // release loop
        }
        break;
        case 80:        // user pressed down arrow
        if (fg < 5)
        {
            fg = 2;     // set return flag
            pd = 0;     // release loop
        }
        break;
        case 75:        // user pressed left arrow
        if (x > r)      // key press is valid so
            --x;        // decrement cursor counter
        break;
        case 77:        // user pressed right arrow
        if (x < r + q)  // key press is valid
            ++x;        // increment cursor counter
        break;
        case 71:        // user pressed home
        x = r;          // reset cursor counter
```

45

```
            break;
                case 79:      // user pressed end
        x = r + strlen(text);
        // reset cursor counter
        break;
        case 83:      // user pressed del
        if (x < r + q)    // key press is valid
        {
            code = (r + q) - x;
            pd = 0;
            for (z = (q - code + 1); z != q; ++z)
            {
                flg = *(text + z);
                *(temp + pd) = flg;
                ++pd;
            }        // see bkspace process for
            *(temp + pd) = '\0';
            // notes on this routine
            *(text + (q - code)) = '\0';
            strcat(text, temp);
            cprintf("%s%c", temp, 32);
                pd = 1;
            --q;
        }
        break;
        case 68:      // user pressed [F10]
        if (fg < 5)
        {
            fg = 3;
            pd = 0;
        }
        }
    }

} while (pd != 0);
    return fg;        // set return flag
}
```

THE SWAPCRYPT PROGRAM FOLLOWS.

The SwapCrypt program file is a Microsoft C++ MFC program broken into an SDI module set, according to one embodiment of the present invention. The modules are stdafx.cpp, mainfrm.cpp, swapcdoc.cpp, swapcvw.cpp, and swapcrpt.cpp. Modules other than swapcrpt.cpp contain text common to generic Windows programs. The module swapcrpt.cpp contains the code that performs encryption tasks according to the present invention.

Through the initialization process documented above, a 20,000 character array located in the data segment of the SwapCrypt program is filled with random data, according to an embodiment of the present invention. This array becomes the encryption pad key used by the program. The invention in the initialization program above was the method of the pad key creation that incorporates a seed file supplied by the user. Here in the SwapCrypt program the invention includes a method by which the utility of the pad key is expanded to more than a single use by way of a password that is used to both encrypt the pad key itself before use and to determine an offset position into the pad key that varies with each new password and/or with each new iteration of the pad key. This is particularly useful should the document being encrypted exceed the 20000 byte length of the pad key.

SwapCrypt is relies upon a stream cipher whereby each successive byte from the plain text document is XORed with each byte from the pad key. The pad key retains its original utility over time and through multiple uses. This is achieved by the use of a multi-character user supplied document password which may be unique to each document encrypted. Before the plain text document is XORed with the pad key, the pad key is XORed with the password. Furthermore, the password can be used to calculate an offset into the pad key where encryption begins. This offset will differ with different passwords. In the event that the plain text document is larger than the 20,000 byte pad key, a new offset is calculated with each iteration through the pad key. This use of the document password ensures that the security of the pad key will withstand a cryptanalysis attack should multiple documents be captured that were encrypted with the same version of the program.

THE STDAFX.CPP MODULE FOLLOWS

```
// stdafx.cpp : source file that includes just the standard includes
#include "stdafx.h"
```

THE MAINFRM.CPP MODULE FOLLOWS

```
// mainfrm.cpp : implementation of the CMainFrame class
#include "stdafx.h"
include "swapcrpt.h"
#include "mainfrm.h"
#include "etcp.h"
#ifdef _DEBUG
undef THIS_FILE
static char BASED_CODE THIS_FILE[] = __FILE__;
endif
IMPLEMENT_DYNCREATE(CMainFrame, CFrameWnd)
BEGIN_MESSAGE_MAP(CMainFrame, CFrameWnd)
    ON_COMMAND(ID_HELP_INDEX, CFrameWnd::OnHelpIndex)
    ON_COMMAND(ID_HELP, CFrameWnd::OnHelp)
```

```
        ON_COMMAND(ID_DEFAULT_HELP, CFrameWnd::OnHelpIndex)
END_MESSAGE_MAP()
CMainFrame::CMainFrame()
{
}
CMainFrame::~CMainFrame()
{
}
BOOL CMainFrame::PreCreateWindow(CREATESTRUCT& cs)
{
        cs.style = WS_OVERLAPPEDWINDOW;
        cs.cy = 490;    // window height
        cs.cx = 640;    // window width
        return CFrameWnd::PreCreateWindow(cs);
}
#ifdef _DEBUG
void CMainFrame::AssertValid() const
{
        CFrameWnd::AssertValid();
}
void CMainFrame::Dump(CDumpContext& dc) const
{
        CFrameWnd::Dump(dc);
}
endif //_DEBUG

THE SWAPCDOC.CPP MODULE FOLLOWS

// swapcdoc.cpp : implementation of the CSwapcrptDoc class
#include "stdafx.h"
include "swapcrpt.h"
include "swapcdoc.h"
ifdef _DEBUG
undef THIS_FILE
static char BASED_CODE THIS_FILE[] = __FILE__;
endif
IMPLEMENT_DYNCREATE(CSwapcrptDoc, CDocument)
BEGIN_MESSAGE_MAP(CSwapcrptDoc, CDocument)
END_MESSAGE_MAP()
CSwapcrptDoc::CSwapcrptDoc()
{
}
CSwapcrptDoc::~CSwapcrptDoc()
{
}
BOOL CSwapcrptDoc::OnNewDocument()
```

```
{
        if (!CDocument::OnNewDocument())
                return FALSE;
        return TRUE;
}
void CSwapcrptDoc::Serialize(CArchive& ar)
{
        if (ar.IsStoring())
        {
        }
        else
        {
        }
}
#ifdef _DEBUG
void CSwapcrptDoc::AssertValid() const
{
        CDocument::AssertValid();
}
void CSwapcrptDoc::Dump(CDumpContext& dc) const
{
        CDocument::Dump(dc);
}
endif //_DEBUG
```

THE SWAPCVW.CPP MODULE FOLLOWS

```
// swapcvw.cpp : implementation of the CSwapcrptView class
#include "stdafx.h"
include "swapcrpt.h"
include "swapcdoc.h"
include "swapcvw.h"
ifdef _DEBUG
undef THIS_FILE
static char BASED_CODE THIS_FILE[] = __FILE__;
endif
IMPLEMENT_DYNCREATE(CSwapcrptView, CView)
BEGIN_MESSAGE_MAP(CSwapcrptView, CView)
END_MESSAGE_MAP()
CSwapcrptView::CSwapcrptView()
{
}
CSwapcrptView::~CSwapcrptView()
{
}
void CSwapcrptView::OnDraw(CDC* pDC)
```

```
{
    CSwapcrptDoc* pDoc = GetDocument();
    ASSERT_VALID(pDoc);
    CDC *pDisplayMemDC = new CDC;
    CBitmap *pBitmap = new CBitmap;
    pBitmap->LoadBitmap(IDB_BITMAP1);
    pDisplayMemDC->CreateCompatibleDC(pDC);
    pDisplayMemDC->SelectObject(pBitmap);
    pDC->BitBlt(0,0, 640, 460, pDisplayMemDC, 0, 0, SRCCOPY);
    delete pDisplayMemDC;
    delete pBitmap;
}
#ifdef _DEBUG
void CSwapcrptView::AssertValid() const
{
    CView::AssertValid();
}
void CSwapcrptView::Dump(CDumpContext& dc) const
{
    CView::Dump(dc);
}
CSwapcrptDoc* CSwapcrptView::GetDocument() // non-debug version is inline
{
    ASSERT(m_pDocument->IsKindOf(RUNTIME_CLASS(CSwapcrptDoc)));
    return (CSwapcrptDoc*)m_pDocument;
}
endif //_DEBUG
```

THE SWAPCRPT.CPP MODULE FOLLOWS

```
// swapcrpt.cpp : Defines the class behaviors for the application.
#include "stdafx.h"
include "swapcrpt.h"
include "dos.h"
include "direct.h"
include "mainfrm.h"
include "swapcdoc.h"
include "swapcvw.h"
include "time.h"
include "etcp.h"
include "dlgs.h"

ifdef _DEBUG
undef THIS_FILE
static char BASED_CODE THIS_FILE[] = __FILE__;
endif
```

```c
#define WIPE
"SWAPCRYPT*SCM*SWAPCRYPT*SCM*SWAPCRYPT*SCM*SWAPCRYPT*SC
M*SCM*"
#define WIPE2
"*SWAPCRYPT*SCM*SWAPCRYPT*SCM*SWAPCRYPT*SCM*SWAPCRYPT*S
CM*SCM"

//==========================================================================
//*** Globals
char crypt[] = ":-(²@";         // encryption stamp
```

The following global variables create a data segment space for the faulty password check, the pad key array, and the sign-on password and password encryption string.

```c
char check[] = "no way are you going to break this cypher!";    //faulty password check
unsigned char huge mutate[20000] = "1234567890";                //key pad array
char passwrd[] = "VOYNICH!";                                    //sign-on password
char passcrpt[] = "_____";                                   //password encryption string
unsigned char text_buf[4096];
char WinPth[128];
clock_t start, finish;

///////////////////////////////////////////////////////////
// CSwapcrptApp

BEGIN_MESSAGE_MAP(CSwapcrptApp, CWinApp)
    //{{AFX_MSG_MAP(CSwapcrptApp)
    ON_COMMAND(ID_APP_ABOUT, OnAppAbout)
    ON_COMMAND(ID_FILE_SELECTFILE, OnFileSelectfile)
    ON_COMMAND(ID_FILE_SELECTDIR, OnFileSelectdir)
    //}}AFX_MSG_MAP
    // Standard file based document commands
END_MESSAGE_MAP()

///////////////////////////////////////////////////////////
// CSwapcrptApp construction CSwapcrptApp::CSwapcrptApp()
{
    // TODO: add construction code here,
    // Place all significant initialization in InitInstance
```

}

////////////////////////////////////////////////////////
// The one and only CSwapcrptApp object CSwapcrptApp NEAR theApp;

////////////////////////////////////////////////////////
// CSwapcrptApp initialization BOOL CSwapcrptApp::InitInstance()
{
    *(crypt + 3) = 26;
    CString pthname;
    CString fname;
    CString outOfHere = "Error! Incorrect password.";
    int x;
    char test[10];
    NotReady bye;

SetDialogBkColor();    // Set dialog background color to gray
    // LoadStdProfileSettings(); // Load standard INI file options (including MRU)

// Register the application's document templates. Document templates
    // serve as the connection between documents, frame windows and views.

CSingleDocTemplate* pDocTemplate;
    pDocTemplate = new CSingleDocTemplate(
        IDR_MAINFRAME,
        RUNTIME_CLASS(CSwapcrptDoc),
        RUNTIME_CLASS(CMainFrame),    // main SDI frame window
        RUNTIME_CLASS(CSwapcrptView));
    AddDocTemplate(pDocTemplate);

// create a new (empty) document
    OnFileNew();
    GetWindowsDirectory(WinPth, 128);
    lstrcat(WinPth, "\\SWAPCRPT.HLP");
    m_pszHelpFilePath = WinPth;

for(x = 0; x < 9; x++)
        *(test + x) = mutate[x];
    if (strncmp(test, "123456789", 9) == 0)
        if(bye.DoModal() == IDOK)
            _exit(0);

if(strcmp(passwrd, "VOYNICH!"))
```

```
                if(password())
                {
                        MessageBeep(-1);
                        AfxMessageBox(outOfHere);
                        _exit(0);
                } finish = clock();
        // if (m_lpCmdLine[0] != '\0')
        // {
                // TODO: add command line processing here
        // }
        return TRUE;
}

/////////////////////////////////////////////////////////////
// CAboutDlg dialog used for App About class CAboutDlg : public CDialog
{
public:
        CAboutDlg();

// Dialog Data
        //{{AFX_DATA(CAboutDlg)
        enum { IDD = IDD_ABOUTBOX };
        //}}AFX_DATA // Implementation
protected:
        virtual void DoDataExchange(CDataExchange* pDX);    // DDX/DDV support
        //{{AFX_MSG(CAboutDlg)
                // No message handlers
        //}}AFX_MSG
        DECLARE_MESSAGE_MAP()
};

CAboutDlg::CAboutDlg() : CDialog(CAboutDlg::IDD)
{
        //{{AFX_DATA_INIT(CAboutDlg)
        //}}AFX_DATA_INIT
} void CAboutDlg::DoDataExchange(CDataExchange* pDX)
{
        CDialog::DoDataExchange(pDX);
        //{{AFX_DATA_MAP(CAboutDlg)
```

```
    //}}AFX_DATA_MAP
}

BEGIN_MESSAGE_MAP(CAboutDlg, CDialog)
    //{{AFX_MSG_MAP(CAboutDlg)
        // No message handlers
    //}}AFX_MSG_MAP
END_MESSAGE_MAP()

// App command to run the dialog
void CSwapcrptApp::OnAppAbout()
{
    CAboutDlg aboutDlg;
    aboutDlg.DoModal();
}

/////////////////////////////////////////////////////////////////
// CSwapcrptApp commands void CSwapcrptApp::OnFileSelectfile()
{
    // TODO: Add your command handler code here
    int x;
    static char BASED_CODE lpszFilter[] = " All Files (*.*) |*.*|";
    CFileDialog dlg(TRUE, NULL, "*.*", OFN_HIDEREADONLY |
        OFN_ENABLETEMPLATE, lpszFilter, NULL);
    CString fname;
    CString pthname;
    CString outOfHere = "Error! Incorrect password.";
    double duration;
    dlg.m_ofn.lpTemplateName = "FILESELECT";
    dlg.m_ofn.hInstance = AfxGetInstanceHandle();

start = clock();
    duration = (double)(start - finish) / CLOCKS_PER_SEC;
    if(duration > 300)
    {
        if(strcmp(passwrd, "VOYNICH!"))
        if(password())
        {
            MessageBeep(-1);
            AfxMessageBox(outOfHere);
            _exit(0);
        }
    } if (dlg.DoModal() == IDOK)
```

```
        {
                pthname = dlg.GetPathName();
                fname = dlg.GetFileTitle();
                if((x = pthname.Find("SWAPCRPT.DIR")) != -1)
                        cryptit(x, &pthname, &fname);
                else
                        cryptit(0, &pthname, &fname);
        }
        finish = clock();
} void CSwapcrptApp::OnFileSelectdir()
{
        // TODO: Add your command handler code here
        int x;
        CFileDialog dlg(TRUE, NULL, "dir", OFN_HIDEREADONLY |
        OFN_ENABLETEMPLATE, "*.*");
        //CFileDialog dlg(TRUE, "", "directory");
        CString pthname;
        CString fname;
        CString outOfHere = "Error! Incorrect password.";
        double duration;
        fname = "DIRECTORY";
   dlg.m_ofn.lpTemplateName = "MYFILEOPEN";
   dlg.m_ofn.hInstance = AfxGetInstanceHandle();

start = clock();
        duration = (double)(start - finish) / CLOCKS_PER_SEC;
        if(duration > 300)
        {
                if(strcmp(passwrd, "VOYNICH!"))
                if(password())
                {
                        MessageBeep(-1);
                        AfxMessageBox(outOfHere);
                        _exit(0);
                }
        } if (dlg.DoModal() == IDOK)
        {
                pthname = dlg.GetPathName();
                if((x = pthname.ReverseFind(92)) != -1)
                        cryptit(x, &pthname, &fname);      //non zero x indicates DIR
                else
                        return;
        }
```

```
        finish = clock();
}
```

The following function cryptit contains code for data encryption.

```
//=========================================================================
//*** function cryptit void cryptit(UINT swtch, CString *pthname, CString *fname)
{
int x, y, flag = 1, offset = 0;
UINT cmprss = 1, i, j;
CString compfle;
CString wrkfle;
CString pthToFle;
CString pthToCmp;
CString Bad_Drive = "Error! Unwritable drive.";
CString yikes = "SwapCrypt can't encrypt itself!";
CFile infile, outfile;
CFileStatus status;
char buf;
char workfle [256];
char pressfle [256];
char filepath [256];
char *code = new char[6];
char *control = new char[6];    // used to check crypt stamp
char *nick = new char[51];
char *rollover = new char[17];
char **array = new char *[1000];
char *ptr;
struct _find_t fileparm;
PsWord dlg;
decrypt dlg2;
GoForIt wait;
Arugh badpass;
StompDlg dlg3;
CCmdTarget *dah = ::AfxGetApp();
strcpy(rollover, passcrpt);
strcat(rollover, passwrd);

if(!infile.Open( "A$P$E$X.~MP", CFile::modeCreate))
{
        MessageBeep(-1);
        AfxMessageBox(Bad_Drive);
        delete code;
        delete control;
```

```
                delete nick;
                delete rollover;
                delete array;
                return;
        }
        else
        {
                infile.Close();
                CFile::Remove("A$P$E$X.~MP");
        } strcpy(code, crypt);
        strcpy(nick, check);
        wrkfle = *fname;
        compfle = *fname;
        pthToFle = *pthname;
        pthToCmp = *pthname;

if((x = wrkfle.Find("SWAPCRPT.EXE")) != -1)
        {
                MessageBeep(-1);
                AfxMessageBox(yikes);
                delete code;
                delete control;
                delete nick;
                delete rollover;
                delete array;
                return;
        } if(swtch)
        {
                strcpy(filepath, pthToFle);
                *(filepath + swtch) = NULL;
                swtch = *(filepath + 0) - 64;
                _dos_setdrive(swtch, &j);
                _chdir(filepath);

if(!(j = _dos_findfirst("*.*", _A_RDONLY, &fileparm)))
                {
                        i = 0;
                        while(!j)
                        {
                                *(array + i) = new char[strlen(fileparm.name) + 1];
                                strcpy(*(array + i), fileparm.name);
                                if(!(strcmp(*(array + i), "SWAPCRPT.DIR")))
                                        swtch = 0;
```

57

```
                    if(!(strcmp(*(array + i), "SWAPCRPT.EXE")))
                    {
                            MessageBeep(-1);
                            AfxMessageBox(yikes);
                            delete code;
                            delete control;
                            delete nick;
                            delete rollover;
                            for(j = 0; j < i; j++)
                                    delete array[j];
                            delete array;
                            return;
                    } j = _dos_findnext(&fileparm);
                    i++;
            }
            if(swtch)          // file or files exist to zip and encrypt
            {
                    strcpy(workfle, "*.*");
                    strcat(filepath, "\\SWAPCRPT.DIR");
                    strcpy(pressfle, filepath);
                    wrkfle = "SWAPCRPT.DIR";
                    fname = &wrkfle;
                    *(control + 0) = NULL;
                    swtch = i;
            }
            else
            {                  // !found directory zip file
                    if(i > 1)  // !!found other files in directory!
                    {
                            if (dlg3.DoModal() == IDCANCEL) //warn about possible
overwright!
                            {
                                    delete code;
                                    delete control;
                                    delete nick;
                                    delete rollover;
                                    for(j = 0; j < i - 1; j++)
                                            delete array[j];
                                    delete array;
                                    return;
                            }
            }
                            for(j = 0; j < i - 1; j++)
                                    delete array[j];
```

```
                            wrkfle = "SWAPCRPT.DIR";
                            fname = &wrkfle;
                            compfle = "S$A$C$P$.TMP";
                            strcpy(pressfle, filepath);
                            strcat(pressfle, "\\S$A$C$P$.TMP");

infile.Open(wrkfle, CFile::modeRead);
                            x = 0;
                            while(infile.Read(&buf, 1))
                            {
                                    *(control + x) = buf;   // this loop reads in first five
                                    x++;                    // bytes of file to check and
                                    if (x == 5)             // make sure that it is encrypted
                                            break;          // by this program.
                            }
                            infile.Close();
                            buf = control[4];
                            *(control + x - 1) = NULL;
                            *(code + x - 1) = NULL;
                    }
            }
            else
            {
                    delete code;
                    delete control;
                    delete nick;
                    delete rollover;
                    delete array;
                    return;                 // empty directory!
            }
    }
    else
    {
            if((x = compfle.Find('.')) != -1)
                    compfle.SetAt(x + 1, '~');
            else
                    compfle += ".tm~";

if((x = pthToCmp.Find('.')) != -1)
                    pthToCmp.SetAt(x + 1, '~');
            else
                    pthToCmp += ".tm~";

strcpy(filepath, pthToFle);
            if((x = pthToFle.Find(*fname)) != -1)
                    *(filepath + (x - 1)) = NULL;
```

```
strcpy(workfle, pthToFle);
strcpy(pressfle, pthToCmp);

infile.Open(wrkfle, CFile::modeRead);
x = 0;
while(infile.Read(&buf, 1))
{
        *(control + x) = buf;   // this loop reads in first five
        x++;                    // bytes of file to check and
        if (x == 5)             // make sure that it is encrypted
                break;          // by this program.
}
infile.Close();
buf = control[4];
*(control + x - 1) = NULL;
*(code + x - 1) = NULL;
} if (strcmp(control, code) != 0)       // not a match! therefore encrypt the file.
{
        if(swtch)
        {
                pthToFle = "Encrypt DIR:\n" + *pthname;
                x = pthToFle.ReverseFind(92);
                ptr = pthToFle.GetBufferSetLength(x);
                dlg.m_dowhat = ptr;
                pthToFle.ReleaseBuffer();
        }
        else
                dlg.m_dowhat = "Encrypt the file: " + *fname;      // notifiy user that
encryption will follow
        while(strlen(dlg.m_password) != 5)
                if (dlg.DoModal() != IDOK)
                {
                        delete code;
                        delete control;
                        delete nick;
                        delete rollover;
                        delete array;
                        return;
                }
                else
                        if(strlen(dlg.m_password) != 5)
                                MessageBeep(-1);
        if(!swtch)
        {
                status.m_mtime = 0;
```

60

```
                status.m_attribute = 0x00;
                CFile::SetStatus(wrkfle, status );
        }
        dah->BeginWaitCursor();
        strcpy(code, dlg.m_password);
}
else                                                // match! this file is already encrypted.
{
        dlg2.m_dowhat = "Decrypt the file: " + *fname;    // notifiy user that decryption will follow
        while(strlen(dlg2.m_decrypt) != 5)
                if (dlg2.DoModal() != IDOK)
                {
                        delete code;
                        delete control;
                        delete nick;
                        delete rollover;
                        delete array;
                        return;
                }
                else
                        if(strlen(dlg2.m_decrypt) != 5)
                                MessageBeep(-1);
        status.m_mtime = 0;
        status.m_attribute = 0x00;
        CFile::SetStatus(wrkfle, status);
        dah->BeginWaitCursor();
        strcpy(code, dlg2.m_decrypt);
        flag = 0;
} if(flag)                                            // encrypt the file
{
buf = crypt[4];
        if(dlg.m_compress || swtch)
        {
                if(crypt[4] == 64)
                        crypt[4] = 66;
                else
                        crypt[4] = 67;

wait.m_hold_it = "Please wait. Compressing: " + *fname;
                wait.Create(IDD_DIALOG2, NULL);

Et4QZip(pressfle, workfle, "-a");
```

```
files!            if(swtch)                         //!directory -- now wipe all
                {
                        for(i = 0; i < swtch; i++)
                        {
                                wrkfle = array[i];
                                status.m_mtime = 0;
                                status.m_attribute = 0x00;
                                CFile::SetStatus(wrkfle, status);
                                wipefle(&wrkfle);
                                CFile::Remove(wrkfle);
                        }
                        wrkfle = "SWAPCRPT.DIR";
                }
                else
                {
                        wipefle(&wrkfle);
                        CFile::Remove(wrkfle);
                        CFile::Rename(compfle, wrkfle);
                }
                wait.DestroyWindow();
        } wait.m_hold_it = "Please wait. Encrypting: " + *fname;
        wait.Create(IDD_DIALOG2, NULL);

infile.Open(wrkfle, CFile::modeRead);
        outfile.Open("e$n$c$r$.~mp", CFile::modeCreate);
        outfile.Close();
        outfile.Open("e$n$c$r$.~mp", CFile::modeWrite);
        outfile.Write(crypt, 5);        // write encryption stamp
        crypt[4] = buf;
        y = 0;
        for (x = 0; x < 50; x++)
        {
                if (y == 5) y = 0;
                *(nick + x) = *(nick + x) ^ *(code + y);
                y++;
        }
        outfile.Write(nick, 50);
}
else                                    // decrypt the file
{
        if(buf == 66 || buf == 67)      // this file was compressed!
                cmprss = 0;
        outfile.Open(compfle, CFile::modeCreate);
        outfile.Close();
```

```
outfile.Open(compfle, CFile::modeWrite);
infile.Open(wrkfle, CFile::modeRead);
infile.Seek(5, Cfile::begin);
```

The following code fragment reads in the 50 bytes of the file header that contains the faulty password check string. Decryption is aborted if the password supplied cannot decrypt the check string.

```
        y = 0;
        infile.Read(nick, 50);
        for (x = 0; x < 50; x++)
        {
                if (y == 5) y = 0;
                *(nick + x) = *(nick + x) ^ *(code + y);
                y++;
        }
        *(nick + 50) = NULL;
    if (strcmp(check, nick) != 0)
    {
        infile.Close();
        outfile.Close();
                CFile::Remove(compfle);
                status.m_mtime = 0;
                status.m_attribute = 0x01;
                CFile::SetStatus(wrkfle, status);
        badpass.DoModal();
        delete code;
                delete control;
                delete nick;
                delete rollover;
                delete array;
        return;
    }
}
```

The following is the actual encryption decryption routine. Since the XOR operation reverses itself, the same process with slight modification will either encrypt or decrypt a file.

The variable flag (below) was previously given a value to identify which operation is indicated. If flag is TRUE the file will be encrypted.

```
if(!flag)
{
        wait.m_hold_it = "Please wait. Decrypting: " + *fname;
        wait.Create(IDD_DIALOG2, NULL);
}
```

In the following for loop the variable rollover is XORed with the user supplied five character document password. Rollover is a 16 byte character array that originally contains the sign-on password and the sign-on password encryption string, both of which are unique to the initialized version of the program. This for loop creates a 16 byte character array that is uniquely derived from initialized data in the program and the five character document password.

```
x = 0;
for(y = 0; y < 16; y++, x++)
{
        *(rollover + y) = *(rollover + y) ^ *(code + x);
        if(x == 5) x = 0;
}
```

In the following for loop the five character document password is used to calculate a numeric offset that will be used to determine the starting position in the pad key where encryption will begin.

```
y = 0;
for(x = 0; x < 5; x++)
        offset = offset + *(code + x);
```

The following while loop reads in the plain text document and encrypts it.

```
y = offset;
x = 0;
while (i = infile.Read(text_buf, sizeof(text_buf)))
{
        for(j = 0; j < i; j++)
        {
                if (x == 17) x = 0;
                if (y == 20000) y = 0;
```

The following conditional ( if y equals offset) routine will execute if encryption has proceeded through the entire length of the pad key back to the offset position. This will occur if the plain text document is larger than 20000 bytes. In this event a new offset position is calculated and encryption continues after a jump to that new position. The current offset value is increased by the value of the byte in the pad key at the offset position. Should this create a new offset value greater than 20000 then the new offset becomes the value of the byte in the pad key located at the position in the pad equal to the current offset value divided by three.

```
                if (y == offset)
                {
                        offset += *(mutate + offset);
                        if (offset >= 20000)
```

64

```
        offset = *(mutate + (offset / 3));
    y = offset;
}
```

The following line of code does the actual data encryption. The character in the pad key (mutate) at position y is XORed with the character in the array (rollover) at position x. That result is then XORed with the character in the plain text file (text_buf) at position j to produce the cypher character. The subscript counters y, x and j are incremented and the loop proceeds to the next iteration until the entire file is processed.

```
        text_buf[j] = text_buf[j] ^ (*(mutate + y) ^ *(rollover + x));
        y++;
        x++;
    }
```

The following line of code writes the cypher character to the output file on disk.

```
        outfile.Write(text_buf, i);
}
infile.Close();
outfile.Close();

if (flag)
{
        wipefle(&wrkfle);
        CFile::Remove(wrkfle);
        CFile::Rename("e$n$c$r$.~mp", wrkfle);
        status.m_mtime = 0;
        status.m_attribute = 0x01;
        CFile::SetStatus(wrkfle, status);
}
else
{
        if(cmprss)                                      // not compressed!
        {
                CFile::Remove(wrkfle);
                CFile::Rename(compfle, wrkfle);
        }
        else
        {
                wait.DestroyWindow();
                wait.m_hold_it = "Please wait. Decompressing:  " + wrkfle;
                wait.Create(IDD_DIALOG2, NULL);
                Et4QUnZip(pressfle, filepath, "*.*", "-o");
                CFile::Remove(compfle);
                if(!(x = _dos_findfirst("SWAPCRPT.DIR", _A_NORMAL, &fileparm)))
                        CFile::Remove("SWAPCRPT.DIR");
```

65

```
        }
} delete code;
delete control;
delete nick;
delete rollover;
if(swtch)
        for(i = 0; i < swtch - 1; i++)
                delete array[i];
delete array;
}

//================================================================
============
//*** function wipefle void wipefle(CString *fname)
{
CFile infile;
long x, flbyte;
CFileStatus status;

status.m_mtime = 0;
status.m_attribute = 0x00;
CFile::SetStatus(*fname, status);
infile.Open(*fname, CFile::modeWrite);
flbyte = infile.GetLength();

for (x = 1; x <= (flbyte / sizeof(WIPE)); x++)
        infile.Write(WIPE, sizeof(WIPE) * 1);
x = flbyte - (flbyte / sizeof(WIPE)) * sizeof(WIPE);
if (x)
        infile.Write(WIPE, x);

if(*(crypt + 4) == 65)
{
        infile.SeekToBegin();
        for (x = 1; x <= (flbyte / sizeof(WIPE)); x++)
                infile.Write(WIPE2, sizeof(WIPE) * 1);
        x = flbyte - (flbyte / sizeof(WIPE)) * sizeof(WIPE);
        if (x)
                infile.Write(WIPE2, x);
        infile.SeekToBegin();
        for (x = 1; x <= (flbyte / sizeof(WIPE)); x++)
                infile.Write(WIPE, sizeof(WIPE) * 1);
        x = flbyte - (flbyte / sizeof(WIPE)) * sizeof(WIPE);
```

```
        if (x)
                infile.Write(WIPE, x);
}
infile.Close();
} int password()
{
int x;
char buffer[9];
PssWrd dlg;
if (dlg.DoModal() == IDOK)
{
        for(x = 0; x < 8; x++)
                buffer[x] = dlg.m_pssword[x] ^ passcrpt[x];
        *(buffer + x) = NULL;
        if(strcmp(buffer, passwrd))
                return 1;
        else
                return 0;
}
return 1;
}

///////////////////////////////////////////////////
// PsWord dialog

PsWord::PsWord(CWnd* pParent /*=NULL*/)
        : CDialog(PsWord::IDD, pParent)
{
        //{{AFX_DATA_INIT(PsWord)
        m_password = "";
        m_dowhat = "";
        m_compress = FALSE;
        //}}AFX_DATA_INIT
} void PsWord::DoDataExchange(CDataExchange* pDX)
{
        CDialog::DoDataExchange(pDX);
        //{{AFX_DATA_MAP(PsWord)
        DDX_Text(pDX, IDC_PASSWORD, m_password);
        DDX_Text(pDX, IDC_DO_WHAT, m_dowhat);
        DDX_Check(pDX, IDC_CHECK1, m_compress);
        //}}AFX_DATA_MAP
}
```

```
BEGIN_MESSAGE_MAP(PsWord, CDialog)
    //{{AFX_MSG_MAP(PsWord)
    //}}AFX_MSG_MAP
END_MESSAGE_MAP()

////////////////////////////////////////////////////////////////
// PsWord message handlers void PsWord::OnOK()
{
    // TODO: Add extra validation here CDialog::OnOK();
} void PsWord::OnCancel()
{
    // TODO: Add extra cleanup here

CDialog::OnCancel();
}
////////////////////////////////////////////////////////////////
// GoForIt dialog GoForIt::GoForIt(CWnd* pParent /*=NULL*/)
    : CDialog(GoForIt::IDD, pParent)
{
    //{{AFX_DATA_INIT(GoForIt)
    m_hold_it = "";
    //}}AFX_DATA_INIT
} void GoForIt::DoDataExchange(CDataExchange* pDX)
{
    CDialog::DoDataExchange(pDX);
    //{{AFX_DATA_MAP(GoForIt)
    DDX_Text(pDX, IDC_message, m_hold_it);
    //}}AFX_DATA_MAP
}

BEGIN_MESSAGE_MAP(GoForIt, CDialog)
    //{{AFX_MSG_MAP(GoForIt)
        // NOTE: the ClassWizard will add message map macros here
    //}}AFX_MSG_MAP
```

```
END_MESSAGE_MAP()

////////////////////////////////////////////////////////////
// GoForIt message handlers ////////////////////////////////////////////////////////////
// Arugh dialog Arugh::Arugh(CWnd* pParent /*=NULL*/)
        : CDialog(Arugh::IDD, pParent)
{
        //{{AFX_DATA_INIT(Arugh)
                // NOTE: the ClassWizard will add member initialization here
        //}}AFX_DATA_INIT
} void Arugh::DoDataExchange(CDataExchange* pDX)
{
        CDialog::DoDataExchange(pDX);
        //{{AFX_DATA_MAP(Arugh)
                // NOTE: the ClassWizard will add DDX and DDV calls here
        //}}AFX_DATA_MAP
}

BEGIN_MESSAGE_MAP(Arugh, CDialog)
        //{{AFX_MSG_MAP(Arugh)
                // NOTE: the ClassWizard will add message map macros here
        //}}AFX_MSG_MAP
END_MESSAGE_MAP()

////////////////////////////////////////////////////////////
// Arugh message handlers
////////////////////////////////////////////////////////////
// NotReady dialog NotReady::NotReady(CWnd* pParent /*=NULL*/)
        : CDialog(NotReady::IDD, pParent)
{
        //{{AFX_DATA_INIT(NotReady)
                // NOTE: the ClassWizard will add member initialization here
        //}}AFX_DATA_INIT
}
```

```
void NotReady::DoDataExchange(CDataExchange* pDX)
{
        CDialog::DoDataExchange(pDX);
        //{{AFX_DATA_MAP(NotReady)
                // NOTE: the ClassWizard will add DDX and DDV calls here
        //}}AFX_DATA_MAP
}

BEGIN_MESSAGE_MAP(NotReady, CDialog)
        //{{AFX_MSG_MAP(NotReady)
                // NOTE: the ClassWizard will add message map macros here
        //}}AFX_MSG_MAP
END_MESSAGE_MAP()

/////////////////////////////////////////////////////////////////
// NotReady message handlers
/////////////////////////////////////////////////////////////////
// PssWrd dialog PssWrd::PssWrd(CWnd* pParent /*=NULL*/)
        : CDialog(PssWrd::IDD, pParent)
{
        //{{AFX_DATA_INIT(PssWrd)
        m_pssword = "";
        //}}AFX_DATA_INIT
} void PssWrd::DoDataExchange(CDataExchange* pDX)
{
        CDialog::DoDataExchange(pDX);
        //{{AFX_DATA_MAP(PssWrd)
        DDX_Text(pDX, IDC_EDIT1, m_pssword);
        //}}AFX_DATA_MAP
}

BEGIN_MESSAGE_MAP(PssWrd, CDialog)
        //{{AFX_MSG_MAP(PssWrd)
                // NOTE: the ClassWizard will add message map macros here
        //}}AFX_MSG_MAP
END_MESSAGE_MAP()

/////////////////////////////////////////////////////////////////
// PssWrd message handlers
/////////////////////////////////////////////////////////////////
// decrypt dialog
```

70

```
decrypt::decrypt(CWnd* pParent /*=NULL*/)
    : CDialog(decrypt::IDD, pParent)
{
    //{{AFX_DATA_INIT(decrypt)
    m_decrypt = "";
    m_dowhat = "";
    //}}AFX_DATA_INIT
} void decrypt::DoDataExchange(CDataExchange* pDX)
{
    CDialog::DoDataExchange(pDX);
    //{{AFX_DATA_MAP(decrypt)
    DDX_Text(pDX, IDC_EDIT1, m_decrypt);
    DDX_Text(pDX, IDC_DO_WHAT, m_dowhat);
    //}}AFX_DATA_MAP
}

BEGIN_MESSAGE_MAP(decrypt, CDialog)
    //{{AFX_MSG_MAP(decrypt)
        // NOTE: the ClassWizard will add message map macros here
    //}}AFX_MSG_MAP
END_MESSAGE_MAP()

/////////////////////////////////////////////////////////////////////
// decrypt message handlers /////////////////////////////////////////////////////////////////////
// StompDlg dialog StompDlg::StompDlg(CWnd* pParent /*=NULL*/)
    : CDialog(StompDlg::IDD, pParent)
{
    //{{AFX_DATA_INIT(StompDlg)
        // NOTE: the ClassWizard will add member initialization here
    //}}AFX_DATA_INIT
} void StompDlg::DoDataExchange(CDataExchange* pDX)
{
    CDialog::DoDataExchange(pDX);
    //{{AFX_DATA_MAP(StompDlg)
```

```
                // NOTE: the ClassWizard will add DDX and DDV calls here
        //}}AFX_DATA_MAP
}

BEGIN_MESSAGE_MAP(StompDlg, CDialog)
        //{{AFX_MSG_MAP(StompDlg)
                // NOTE: the ClassWizard will add message map macros here
        //}}AFX_MSG_MAP
END_MESSAGE_MAP()

/////////////////////////////////////////////////////////////
// StompDlg message handlers
```

Appendix B. below provides an example of C++ code according to the present invention.

APPENDIX B.

```
// swapcdoc.cpp : implementation of the CSwapcrptDoc class
// include "stdafx.h"
include "swapcrpt.h"

include "swapcdoc.h"

ifdef _DEBUG
undef THIS_FILE
static char BASED_CODE THIS_FILE[] = __FILE__;
endif /////////////////////////////////////////////////////////////
// CSwapcrptDoc IMPLEMENT_DYNCREATE(CSwapcrptDoc, CDocument)
```

```
BEGIN_MESSAGE_MAP(CSwapcrptDoc, CDocument)
    //{{AFX_MSG_MAP(CSwapcrptDoc)
        // NOTE - the ClassWizard will add and remove mapping macros here.
        //    DO NOT EDIT what you see in these blocks of generated code!
    //}}AFX_MSG_MAP
END_MESSAGE_MAP()

/////////////////////////////////////////////////////////////////////////////
// CSwapcrptDoc construction/destruction CSwapcrptDoc::CSwapcrptDoc()
{
    // TODO: add one-time construction code here
}

CSwapcrptDoc::~CSwapcrptDoc()
{
}

BOOL CSwapcrptDoc::OnNewDocument()
{
    if (!CDocument::OnNewDocument())
        return FALSE;

// TODO: add reinitialization code here
    // (SDI documents will reuse this document)

return TRUE;
}

/////////////////////////////////////////////////////////////////////////////
// CSwapcrptDoc serialization void CSwapcrptDoc::Serialize(CArchive& ar)
{
```

```
        if (ar.IsStoring())
        {
                // TODO: add storing code here
        }
        else
        {
                // TODO: add loading code here
        }
}

/////////////////////////////////////////////////////////////////////////////
// CSwapcrptDoc diagnostics ifdef _DEBUG
void CSwapcrptDoc::AssertValid() const
{
        CDocument::AssertValid();
} void CSwapcrptDoc::Dump(CDumpContext& dc) const
{
        CDocument::Dump(dc);
}
endif //_DEBUG /////////////////////////////////////////////////////////////////////////////
// CSwapcrptDoc commands
```

Appendix C. below provides an example of C++ code according to the present invention.

APPENDIX C.

// swapcrpt.cpp : Defines the class behaviors for the application.
//

// Microsoft help 206-635-7007

```
// 12026901014213378890 include "stdafx.h"
include "swapcrpt.h"

include "dos.h"
include "direct.h"
include "mainfrm.h"
include "swapcdoc.h"
include "swapcvw.h"
include "time.h"
include "etcp.h"
include "dlgs.h"

ifdef _DEBUG
undef THIS_FILE
static char BASED_CODE THIS_FILE[] = __FILE__;
endif define WIPE
"SWAPCRYPT*SCM*SWAPCRYPT*SCM*SWAPCRYPT*SCM*SWAPC
RYPT*SCM*SCM*"
define WIPE2
"XOXOXOXOXOXOXOXOXOXOXOXOXOXOXOXOXOXOXOXOXOXOXO
XOXOXOXOXOXOXOXO"

//================================================================
//================================
//*** Globals
char crypt[] = ":-(²@";             // encryption stamp
char check[] = "no way in Samuel are you going to break this cipher!";
unsigned char huge mutate[20000] = "1234567890";
char passwrd[] = "VOYNICH!";
char passcrpt[] = "••••••••";
unsigned char text_buf[4096];
char WinPth[128];
clock_t start, finish;
```

```
//////////////////////////////////////////////////////////
// CSwapcrptApp

BEGIN_MESSAGE_MAP(CSwapcrptApp, CWinApp)
    //{{AFX_MSG_MAP(CSwapcrptApp)
    ON_COMMAND(ID_APP_ABOUT, OnAppAbout)
    ON_COMMAND(ID_FILE_SELECTFILE, OnFileSelectfile)
    ON_COMMAND(ID_FILE_SELECTDIR, OnFileSelectdir)
    //}}AFX_MSG_MAP
    // Standard file based document commands
END_MESSAGE_MAP()

//////////////////////////////////////////////////////////
// CSwapcrptApp construction CSwapcrptApp::CSwapcrptApp()
{
    // TODO: add construction code here,
    // Place all significant initialization in InitInstance
}

//////////////////////////////////////////////////////////
// The one and only CSwapcrptApp object CSwapcrptApp NEAR theApp;

//////////////////////////////////////////////////////////
// CSwapcrptApp initialization BOOL CSwapcrptApp::InitInstance()
{
    // Standard initialization
    // If you are not using these features and wish to reduce the size
    //  of your final executable, you should remove from the following
    //  the specific initialization routines you do not need.
```

```
*(crypt + 3) = 26;
CString pthname;
CString fname;
CString outOfHere = "Error! Incorrect password.";
int x;
char test[10];
NotReady bye;

SetDialogBkColor();      // Set dialog background color to gray
// LoadStdProfileSettings();  // Load standard INI file options (including MRU)

// Register the application's document templates.  Document templates
// serve as the connection between documents, frame windows and views.

CSingleDocTemplate* pDocTemplate;
pDocTemplate = new CSingleDocTemplate(
    IDR_MAINFRAME,
    RUNTIME_CLASS(CSwapcrptDoc),
    RUNTIME_CLASS(CMainFrame),   // main SDI frame window
    RUNTIME_CLASS(CSwapcrptView));
AddDocTemplate(pDocTemplate);

// create a new (empty) document
OnFileNew();
GetWindowsDirectory(WinPth, 128);
lstrcat(WinPth, "\\SWAPCRPT.HLP");
m_pszHelpFilePath = WinPth;

for(x = 0; x < 9; x++)
    *(test + x) = mutate[x];
if (strncmp(test, "123456789", 9) == 0)
    if(bye.DoModal() == IDOK)
        _exit(0);

if(strcmp(passwrd, "VOYNICH!"))
```

77

```
            if(password())
            {
                    MessageBeep(-1);
                    AfxMessageBox(outOfHere);
                    _exit(0);
            } finish = clock();
    //  if (m_lpCmdLine[0] != '\0')
    //  {
            //  TODO: add command line processing here
    //  }
            return TRUE;
}

/////////////////////////////////////////////////////////////////////////////
// CAboutDlg dialog used for App About class CAboutDlg : public CDialog
{
public:
        CAboutDlg();

// Dialog Data
        //{{AFX_DATA(CAboutDlg)
        enum { IDD = IDD_ABOUTBOX };
        //}}AFX_DATA // Implementation
protected:
        virtual void DoDataExchange(CDataExchange* pDX);    // DDX/DDV support
        //{{AFX_MSG(CAboutDlg)
                // No message handlers
        //}}AFX_MSG
        DECLARE_MESSAGE_MAP()
};
```

```
CAboutDlg::CAboutDlg() : CDialog(CAboutDlg::IDD)
{
    //{{AFX_DATA_INIT(CAboutDlg)
    //}}AFX_DATA_INIT
} void CAboutDlg::DoDataExchange(CDataExchange* pDX)
{
    CDialog::DoDataExchange(pDX);
    //{{AFX_DATA_MAP(CAboutDlg)
    //}}AFX_DATA_MAP
}

BEGIN_MESSAGE_MAP(CAboutDlg, CDialog)
    //{{AFX_MSG_MAP(CAboutDlg)
        // No message handlers
    //}}AFX_MSG_MAP
END_MESSAGE_MAP()

// App command to run the dialog
void CSwapcrptApp::OnAppAbout()
{
    CAboutDlg aboutDlg;
    aboutDlg.DoModal();
}

/////////////////////////////////////////////////////////////////
// CSwapcrptApp commands void CSwapcrptApp::OnFileSelectfile()
{
    // TODO: Add your command handler code here
    int x;
    static char BASED_CODE lpszFilter[] = " All Files (*.*) |*.*|";
    CFileDialog dlg(TRUE, NULL, "*.*", OFN_HIDEREADONLY |
        OFN_ENABLETEMPLATE, lpszFilter, NULL);
```

```
        CString fname;
        CString pthname;
        CString outOfHere = "Error! Incorrect password.";
        double duration;
    dlg.m_ofn.lpTemplateName = "FILESELECT";
    dlg.m_ofn.hInstance = AfxGetInstanceHandle();

start = clock();
        duration = (double)(start - finish) / CLOCKS_PER_SEC;
        if(duration > 300)
        {
                if(strcmp(passwrd, "VOYNICH!"))
                if(password())
                {
                        MessageBeep(-1);
                        AfxMessageBox(outOfHere);
                        _exit(0);
                }
        } if (dlg.DoModal() == IDOK)
        {
                pthname = dlg.GetPathName();
                fname = dlg.GetFileTitle();
                if((x = pthname.Find("SWAPCRPT.DIR")) != -1)
                        cryptit(x, &pthname, &fname);
                else
                        cryptit(0, &pthname, &fname);
        }
        finish = clock();
} void CSwapcrptApp::OnFileSelectdir()
{
        // TODO: Add your command handler code here
        int x;
        CFileDialog dlg(TRUE, NULL, "dir", OFN_HIDEREADONLY |
```

```
        OFN_ENABLETEMPLATE, "*.*");
        //CFileDialog dlg(TRUE, "", "directory");
        CString pthname;
        CString fname;
        CString outOfHere = "Error! Incorrect password.";
        double duration;
        fname = "DIRECTORY";
    dlg.m_ofn.lpTemplateName = "MYFILEOPEN";
    dlg.m_ofn.hInstance = AfxGetInstanceHandle();

start = clock();
        duration = (double)(start - finish) / CLOCKS_PER_SEC;
        if(duration > 300)
        {
            if(strcmp(passwrd, "VOYNICH!"))
            if(password())
            {
                MessageBeep(-1);
                AfxMessageBox(outOfHere);
                _exit(0);
            }
        } if (dlg.DoModal() == IDOK)
        {
            pthname = dlg.GetPathName();
            if((x = pthname.ReverseFind(92)) != -1)
                cryptit(x, &pthname, &fname);    //non zero x indicates
DIR
            else
                return;
        }
        finish = clock();
}

//========================================================
=====================
```

//*** function cryptit

```
void cryptit(UINT swtch, CString *pthname, CString *fname)
{
int x, y, flag = 1, offset = 0;
UINT cmprss = 1, i, j;
CString compfle;
CString wrkfle;
CString pthToFle;
CString pthToCmp;
CString Bad_Drive = "Error! Unwritable drive.";
CString yikes = "SwapCrypt can't encrypt itself!";
CFile infile, outfile;
CFileStatus status;
char buf;
char workfle [256];
char pressfle [256];
char filepath [256];
char *code = new char[6];
char *control = new char[6];      // used to check crypt stamp
char *nick = new char[51];
char **array = new char *[1000];
char *ptr;
struct _find_t fileparm;
PsWord dlg;
decrypt dlg2;
GoForIt wait;
Flit badpass;
StompDlg dlg3;
CCmdTarget *dah = ::AfxGetApp();

if(!infile.Open( "A$P$E$X.~MP", CFile::modeCreate))
{
      MessageBeep(-1);
      AfxMessageBox(Bad_Drive);
      delete code;
      delete control;
```

```
            delete nick;
            delete array;
            return;
    }
    else
    {
            infile.Close();
            CFile::Remove("A$P$E$X.~MP");
    } strcpy(code, crypt);
    strcpy(nick, check);
    wrkfle = *fname;
    compfle = *fname;
    pthToFle = *pthname;
    pthToCmp = *pthname;

if((x = wrkfle.Find("SWAPCRPT.EXE")) != -1)
    {
            MessageBeep(-1);
            AfxMessageBox(yikes);
            delete code;
            delete control;
            delete nick;
            delete array;
            return;
    } if(swtch)
    {
            strcpy(filepath, pthToFle);
            *(filepath + swtch) = NULL;
            swtch = *(filepath + 0) - 64;
            _dos_setdrive(swtch, &j);
            _chdir(filepath);

if(!(j = _dos_findfirst("*.*", _A_RDONLY, &fileparm)))
```

```
{
    i = 0;
    while(!j)
    {
        *(array + i) = new char[strlen(fileparm.name) + 1];
        strcpy(*(array + i), fileparm.name);
        if(!(strcmp(*(array + i), "SWAPCRPT.DIR")))
                swtch = 0;

if(!(strcmp(*(array + i), "SWAPCRPT.EXE")))
        {
                MessageBeep(-1);
                AfxMessageBox(yikes);
                delete code;
                delete control;
                delete nick;
                for(j = 0; j < i; j++)
                        delete array[j];
                delete array;
                return;
        } j = _dos_findnext(&fileparm);
        i++;
    }
    if(swtch)          // file or files exist to zip and encrypt
    {
        strcpy(workfle, "*.*");
        strcat(filepath, "\\SWAPCRPT.DIR");
        strcpy(pressfle, filepath);
        wrkfle = "SWAPCRPT.DIR";
        fname = &wrkfle;
        *(control + 0) = NULL;
        swtch = i;
    }
    else
    {                   // !found directory zip file
```

```
              if(i > 1)      // !!found other files in directory!
              {
                      if (dlg3.DoModal() == IDCANCEL) //warn about
possible overwright!
                      {
                              delete code;
                              delete control;
                              delete nick;
                              for(j = 0; j < i - 1; j++)
                                      delete array[j];
                              delete array;
                              return;
                      }
              }
              for(j = 0; j < i - 1; j++)
                      delete array[j];
              wrkfle = "SWAPCRPT.DIR";
              fname = &wrkfle;
              compfle = "S$A$C$P$.TMP";
              strcpy(pressfle, filepath);
              strcat(pressfle, "\\S$A$C$P$.TMP");

infile.Open(wrkfle, CFile::modeRead);
              x = 0;
              while(infile.Read(&buf, 1))
              {
                      *(control + x) = buf;   // this loop reads in first five
                      x++;                    // bytes of file to check and
                      if (x == 5)             // make sure that it is encrypted
                              break;          // by this program.
              }
              infile.Close();
              buf = control[4];
              *(control + x - 1) = NULL;
              *(code + x - 1) = NULL;
      }
}
```

```
                else
                {
                        delete code;
                        delete control;
                        delete nick;
                        delete array;
                        return;                  // empty directory!
                }
        }
        else
        {
                if((x = compfle.Find('.')) != -1)
                        compfle.SetAt(x + 1, '~');
                else
                        compfle += ".tm~";

if((x = pthToCmp.Find('.')) != -1)
                        pthToCmp.SetAt(x + 1, '~');
                else
                        pthToCmp += ".tm~";

strcpy(filepath, pthToFle);
                if((x = pthToFle.Find(*fname)) != -1)
                        *(filepath + (x - 1)) = NULL;

strcpy(workfle, pthToFle);
                strcpy(pressfle, pthToCmp);

infile.Open(wrkfle, CFile::modeRead);
                x = 0;
                while(infile.Read(&buf, 1))
                {
                        *(control + x) = buf;    // this loop reads in first five
                        x++;                     // bytes of file to check and
                        if (x == 5)              // make sure that it is encrypted
                                break;           // by this program.
                }
```

```
        infile.Close();
        buf = control[4];
        *(control + x - 1) = NULL;
        *(code + x - 1) = NULL;
} if (strcmp(control, code) != 0)      // not a match! therefore encrypt the file.
{
        if(swtch)
        {
                pthToFle = "Encrypt DIR:\n" + *pthname;
                x = pthToFle.ReverseFind(92);
                ptr = pthToFle.GetBufferSetLength(x);
                dlg.m_dowhat = ptr;
                pthToFle.ReleaseBuffer();
        }
        else
                dlg.m_dowhat = "Encrypt the file: " + *fname; // place code to
notifiy user that encryption will follow
             while(strlen(dlg.m_password) != 5)
                if (dlg.DoModal() != IDOK)
                {
                        delete code;
                        delete control;
                        delete nick;
                        delete array;
                        return;
                }
                else
                        if(strlen(dlg.m_password) != 5)
                                MessageBeep(-1);
        if(!swtch)
        {
                status.m_mtime = 0;
                status.m_attribute = 0x00;
                CFile::SetStatus(wrkfle, status );
        }
```

```
            dah->BeginWaitCursor();
            strcpy(code, dlg.m_password);
}
else                                    // match! this file is already
encrypted.
{
            dlg2.m_dowhat = "Decrypt the file: " + *fname;    // place code to
notifiy user that decryption will follow
            while(strlen(dlg2.m_decrypt) != 5)
                    if (dlg2.DoModal() != IDOK)
                    {
                            delete code;
                            delete control;
                            delete nick;
                            delete array;
                            return;
                    }
                    else
                            if(strlen(dlg2.m_decrypt) != 5)
                                    MessageBeep(-1);
            status.m_mtime = 0;
            status.m_attribute = 0x00;
            CFile::SetStatus(wrkfle, status);
            dah->BeginWaitCursor();
            strcpy(code, dlg2.m_decrypt);
            flag = 0;
} if(flag)                                // encrypt the file
{
buf = crypt[4];
            if(dlg.m_compress || swtch)
            {
                    if(crypt[4] == 64)
                            crypt[4] = 66;
                    else
                            crypt[4] = 67;
```

```
        wait.m_hold_it = "Please wait. Compressing: " + *fname;
        wait.Create(IDD_DIALOG2, NULL);

Et4QZip(pressfle, workfle, "-a");

if(swtch)                           //!directory -- now wipe all files!
        {
            for(i = 0; i < swtch; i++)
            {
                wrkfle = array[i];
                status.m_mtime = 0;
                status.m_attribute = 0x00;
                CFile::SetStatus(wrkfle, status);
                wipefle(&wrkfle);
                CFile::Remove(wrkfle);
            }
            wrkfle = "SWAPCRPT.DIR";
        }
        else
        {
            wipefle(&wrkfle);
            CFile::Remove(wrkfle);
            CFile::Rename(compfle, wrkfle);
        }
        wait.DestroyWindow();
} wait.m_hold_it = "Please wait. Encrypting: " + *fname;
wait.Create(IDD_DIALOG2, NULL);

infile.Open(wrkfle, CFile::modeRead);
outfile.Open("e$n$c$r$.~mp", CFile::modeCreate);
outfile.Close();
outfile.Open("e$n$c$r$.~mp", CFile::modeWrite);
outfile.Write(crypt, 5);  // write encryption stamp
```

```
            crypt[4] = buf;
            y = 0;
            for (x = 0; x < 50; x++)
            {
                    if (y == 5) y = 0;
                    *(nick + x) = *(nick + x) ^ *(code + y);
                    y++;
            }
            outfile.Write(nick, 50);
    }
    else                                    // decrypt the file
    {
            if(buf == 66 || buf == 67)      // this file was compressed!
                    cmprss = 0;
            outfile.Open(compfle, CFile::modeCreate);
            outfile.Close();
            outfile.Open(compfle, CFile::modeWrite);
            infile.Open(wrkfle, CFile::modeRead);
            infile.Seek(5, CFile::begin);

y = 0;
            infile.Read(nick, 50);
            for (x = 0; x < 50; x++)
            {
                    if (y == 5) y = 0;
                    *(nick + x) = *(nick + x) ^ *(code + y);
                    y++;
            }
            *(nick + 50) = NULL;
        if (strcmp(check, nick) != 0)
        {
            infile.Close();
            outfile.Close();
                    CFile::Remove(compfle);
                    status.m_mtime = 0;
                    status.m_attribute = 0x01;
                    CFile::SetStatus(wrkfle, status);
```

```
        badpass.DoModal();
        delete code;
            delete control;
            delete nick;
            delete array;
        return;
    }
}

//*********************************************************
//*** encryption/decryption routine if(!flag)
{
    wait.m_hold_it = "Please wait. Decrypting:  " + *fname;
    wait.Create(IDD_DIALOG2, NULL);
} y = 0;
for(x = 0; x < 5; x++)
        offset = offset + *(code + x);
        y = offset;
x = 0;
while (i = infile.Read(text_buf, sizeof(text_buf)))
{
    for(j = 0; j < i; j++)
    {
        if (x == 5) x = 0;
        if (y == 20000) y = 0;
        if (y == offset)
        {
          offset += mutate[offset];
          if(offset >= 20000)
              offset = mutate[offset/3];
          y = offset;
        }
        text_buf[j] = text_buf[j] ^ (*(mutate + y) ^ *(code + x));
```

```
                y++;
                x++;
        }
        outfile.Write(text_buf, i);
}
infile.Close();
outfile.Close();

if (flag)
{
        wipefle(&wrkfle);
        CFile::Remove(wrkfle);
        CFile::Rename("e$n$c$r$.~mp", wrkfle);
        status.m_mtime = 0;
        status.m_attribute = 0x01;
        CFile::SetStatus(wrkfle, status);
}
else
{
        if(cmprss)                                    // not compressed!
        {
                CFile::Remove(wrkfle);
                CFile::Rename(compfle, wrkfle);
        }
        else
        {
                wait.DestroyWindow();
                wait.m_hold_it = "Please wait. Decompressing:  " + wrkfle;
                wait.Create(IDD_DIALOG2, NULL);
                Et4QUnZip(pressfle, filepath, "*.*", "-o");
                CFile::Remove(compfle);
                if(!(x = _dos_findfirst("SWAPCRPT.DIR", _A_NORMAL,
&fileparm)))
                        CFile::Remove("SWAPCRPT.DIR");
        }
}
```

```
delete code;
delete control;
delete nick;
if(swtch)
        for(i = 0; i < swtch - 1; i++)
                delete array[i];
delete array;
}

//=====================================================================
//===================
//*** function wipefle void wipefle(CString *fname)
{
CFile infile;
long x, flbyte;
CFileStatus status;

status.m_mtime = 0;
status.m_attribute = 0x00;
CFile::SetStatus(*fname, status);
infile.Open(*fname, CFile::modeWrite);
flbyte = infile.GetLength();

for (x = 1; x <= (flbyte / sizeof(WIPE)); x++)
        infile.Write(WIPE, sizeof(WIPE) * 1);
x = flbyte - (flbyte / sizeof(WIPE)) * sizeof(WIPE);
if (x)
        infile.Write(WIPE, x);

if(*(crypt + 4) == 65)
{
        infile.SeekToBegin();
        for (x = 1; x <= (flbyte / sizeof(WIPE)); x++)
                infile.Write(WIPE2, sizeof(WIPE) * 1);
        x = flbyte - (flbyte / sizeof(WIPE)) * sizeof(WIPE);
```

```
            if (x)
                    infile.Write(WIPE2, x);
            infile.SeekToBegin();
            for (x = 1; x <= (flbyte / sizeof(WIPE)); x++)
                    infile.Write(WIPE, sizeof(WIPE) * 1);
            x = flbyte - (flbyte / sizeof(WIPE)) * sizeof(WIPE);
            if (x)
                    infile.Write(WIPE, x);
    }
    infile.Close();
} int password()
{
int x;
char buffer[9];
PssWrd dlg;
if (dlg.DoModal() == IDOK)
{
        for(x = 0; x < 8; x++)
                buffer[x] = dlg.m_pssword[x] ^ passcrpt[x];
        *(buffer + x) = NULL;
        if(strcmp(buffer, passwrd))
                return 1;
        else
                return 0;
}
return 1;
}

/////////////////////////////////////////////////////////////////
// PsWord dialog PsWord::PsWord(CWnd* pParent /*=NULL*/)
        : CDialog(PsWord::IDD, pParent)
{
```

```
    //{{AFX_DATA_INIT(PsWord)
    m_password = "";
    m_dowhat = "";
    m_compress = FALSE;
    //}}AFX_DATA_INIT
} void PsWord::DoDataExchange(CDataExchange* pDX)
{
    CDialog::DoDataExchange(pDX);
    //{{AFX_DATA_MAP(PsWord)
    DDX_Text(pDX, IDC_PASSWORD, m_password);
    DDX_Text(pDX, IDC_DO_WHAT, m_dowhat);
    DDX_Check(pDX, IDC_CHECK1, m_compress);
    //}}AFX_DATA_MAP
}

BEGIN_MESSAGE_MAP(PsWord, CDialog)
    //{{AFX_MSG_MAP(PsWord)
    //}}AFX_MSG_MAP
END_MESSAGE_MAP()

///////////////////////////////////////////////////////////////
// PsWord message handlers void PsWord::OnOK()
{
    // TODO: Add extra validation here CDialog::OnOK();
} void PsWord::OnCancel()
{
    // TODO: Add extra cleanup here
```

```
        CDialog::OnCancel();
}
//////////////////////////////////////////////////////////////
// GoForIt dialog GoForIt::GoForIt(CWnd* pParent /*=NULL*/)
        : CDialog(GoForIt::IDD, pParent)
{
        //{{AFX_DATA_INIT(GoForIt)
        m_hold_it = "";
        //}}AFX_DATA_INIT
} void GoForIt::DoDataExchange(CDataExchange* pDX)
{
        CDialog::DoDataExchange(pDX);
        //{{AFX_DATA_MAP(GoForIt)
        DDX_Text(pDX, IDC_message, m_hold_it);
        //}}AFX_DATA_MAP
}

BEGIN_MESSAGE_MAP(GoForIt, CDialog)
        //{{AFX_MSG_MAP(GoForIt)
                // NOTE: the ClassWizard will add message map macros here
        //}}AFX_MSG_MAP
END_MESSAGE_MAP()

//////////////////////////////////////////////////////////////
// GoForIt message handlers //////////////////////////////////////////////////////////////
// Flit dialog Flit::Flit(CWnd* pParent /*=NULL*/)
```

```
        : CDialog(Flit::IDD, pParent)
{
    //{{AFX_DATA_INIT(Flit)
        // NOTE: the ClassWizard will add member initialization here
    //}}AFX_DATA_INIT
} void Flit::DoDataExchange(CDataExchange* pDX)
{
    CDialog::DoDataExchange(pDX);
    //{{AFX_DATA_MAP(Flit)
        // NOTE: the ClassWizard will add DDX and DDV calls here
    //}}AFX_DATA_MAP
}

BEGIN_MESSAGE_MAP(Flit, CDialog)
    //{{AFX_MSG_MAP(Flit)
        // NOTE: the ClassWizard will add message map macros here
    //}}AFX_MSG_MAP
END_MESSAGE_MAP()

///////////////////////////////////////////////////////////////
// Flit message handlers
///////////////////////////////////////////////////////////////
// NotReady dialog NotReady::NotReady(CWnd* pParent /*=NULL*/)
        : CDialog(NotReady::IDD, pParent)
{
    //{{AFX_DATA_INIT(NotReady)
        // NOTE: the ClassWizard will add member initialization here
    //}}AFX_DATA_INIT
} void NotReady::DoDataExchange(CDataExchange* pDX)
```

```
{
    CDialog::DoDataExchange(pDX);
    //{{AFX_DATA_MAP(NotReady)
        // NOTE: the ClassWizard will add DDX and DDV calls here
    //}}AFX_DATA_MAP
}

BEGIN_MESSAGE_MAP(NotReady, CDialog)
    //{{AFX_MSG_MAP(NotReady)
        // NOTE: the ClassWizard will add message map macros here
    //}}AFX_MSG_MAP
END_MESSAGE_MAP()

/////////////////////////////////////////////////////////////////////////
// NotReady message handlers
/////////////////////////////////////////////////////////////////////////
// PssWrd dialog PssWrd::PssWrd(CWnd* pParent /*=NULL*/)
    : CDialog(PssWrd::IDD, pParent)
{
    //{{AFX_DATA_INIT(PssWrd)
    m_pssword = "";
    //}}AFX_DATA_INIT
} void PssWrd::DoDataExchange(CDataExchange* pDX)
{
    CDialog::DoDataExchange(pDX);
    //{{AFX_DATA_MAP(PssWrd)
    DDX_Text(pDX, IDC_EDIT1, m_pssword);
    //}}AFX_DATA_MAP
}

BEGIN_MESSAGE_MAP(PssWrd, CDialog)
```

```
    //{{AFX_MSG_MAP(PssWrd)
        // NOTE: the ClassWizard will add message map macros here
    //}}AFX_MSG_MAP
END_MESSAGE_MAP()

///////////////////////////////////////////////////////////
// PssWrd message handlers
///////////////////////////////////////////////////////////
// decrypt dialog decrypt::decrypt(CWnd* pParent /*=NULL*/)
    : CDialog(decrypt::IDD, pParent)
{
    //{{AFX_DATA_INIT(decrypt)
    m_decrypt = "";
    m_dowhat = "";
    //}}AFX_DATA_INIT
} void decrypt::DoDataExchange(CDataExchange* pDX)
{
    CDialog::DoDataExchange(pDX);
    //{{AFX_DATA_MAP(decrypt)
    DDX_Text(pDX, IDC_EDIT1, m_decrypt);
    DDX_Text(pDX, IDC_DO_WHAT, m_dowhat);
    //}}AFX_DATA_MAP
}

BEGIN_MESSAGE_MAP(decrypt, CDialog)
    //{{AFX_MSG_MAP(decrypt)
        // NOTE: the ClassWizard will add message map macros here
    //}}AFX_MSG_MAP
END_MESSAGE_MAP()
```

////////////////////////////////////////////////////
// decrypt message handlers ////////////////////////////////////////////////////
// StompDlg dialog StompDlg::StompDlg(CWnd* pParent /*=NULL*/)
    : CDialog(StompDlg::IDD, pParent)
{
    //{{AFX_DATA_INIT(StompDlg)
        // NOTE: the ClassWizard will add member initialization here
    //}}AFX_DATA_INIT
} void StompDlg::DoDataExchange(CDataExchange* pDX)
{
    CDialog::DoDataExchange(pDX);
    //{{AFX_DATA_MAP(StompDlg)
        // NOTE: the ClassWizard will add DDX and DDV calls here
    //}}AFX_DATA_MAP
}

BEGIN_MESSAGE_MAP(StompDlg, CDialog)
    //{{AFX_MSG_MAP(StompDlg)
        // NOTE: the ClassWizard will add message map macros here
    //}}AFX_MSG_MAP
END_MESSAGE_MAP()

////////////////////////////////////////////////////
// StompDlg message handlers

APPENDIX D.

```cpp
// swapcvw.cpp : implementation of the CSwapcrptView class
// include "stdafx.h"
include "swapcrpt.h"

include "swapcdoc.h"
include "swapcvw.h"

ifdef _DEBUG
undef THIS_FILE
static char BASED_CODE THIS_FILE[] = __FILE__;
endif /////////////////////////////////////////////////////////////////
// CSwapcrptView IMPLEMENT_DYNCREATE(CSwapcrptView, CView)

BEGIN_MESSAGE_MAP(CSwapcrptView, CView)
    //{{AFX_MSG_MAP(CSwapcrptView)
        // NOTE - the ClassWizard will add and remove mapping macros here.
        //    DO NOT EDIT what you see in these blocks of generated code!
    //}}AFX_MSG_MAP
END_MESSAGE_MAP()

/////////////////////////////////////////////////////////////////
// CSwapcrptView construction/destruction
```

Appendix D. below provides an example of C++ code according to the present invention.

```
CSwapcrptView::CSwapcrptView()
{
    // TODO: add construction code here
}

CSwapcrptView::~CSwapcrptView()
{
}

/////////////////////////////////////////////////////////////////
// CSwapcrptView drawing void CSwapcrptView::OnDraw(CDC* pDC)
{
    CSwapcrptDoc* pDoc = GetDocument();
    ASSERT_VALID(pDoc);

CDC *pDisplayMemDC = new CDC;
    CBitmap *pBitmap = new CBitmap;
    pBitmap->LoadBitmap(IDB_BITMAP1);
    pDisplayMemDC->CreateCompatibleDC(pDC);
    pDisplayMemDC->SelectObject(pBitmap);
    pDC->BitBlt(0,0, 640, 460, pDisplayMemDC, 0, 0, SRCCOPY);
    delete pDisplayMemDC;
    delete pBitmap;

// TODO: add draw code for native data here
}

/////////////////////////////////////////////////////////////////
// CSwapcrptView diagnostics ifdef _DEBUG
void CSwapcrptView::AssertValid() const
{
    CView::AssertValid();
}
```

```
void CSwapcrptView::Dump(CDumpContext& dc) const
{
    CView::Dump(dc);
}

CSwapcrptDoc* CSwapcrptView::GetDocument() // non-debug version is
inline
{
    ASSERT(m_pDocument-
>IsKindOf(RUNTIME_CLASS(CSwapcrptDoc)));
    return (CSwapcrptDoc*)m_pDocument;
}
endif //_DEBUG /////////////////////////////////////////////////////////////////
// CSwapcrptView message handlers
```

What is claimed is:

1. A method of generating a pad from a selected file stored in computer memory, comprising:

extracting a first value from a selected file stored in a computer memory, generating a pseudo random number, logically combining the first value with the pseudo random number to generate a first random character of a pad, and successively repeating the prior steps to produce next random characters of a pad.

2. The method according to claim 1, wherein logically combining includes performing an XOR operation.

3. The method of claim 1 further comprising choosing the selected file from one of a plurality of files stored in computer memory before extracting a first value.

4. The method of claim 3 wherein logically combining includes performing an XOR operation.

5. An encryption method comprising:

logically combining characters of a selected character file in a computer memory with random numbers to produce elements of a pad of predetermined dimension, and logically combining characters of plain text with corresponding elements of the pad.

6. The encryption method of claim 5, wherein the predetermined dimension of the pad is greater than the number of characters of plain text being combined logically.

7. The encryption method of claim 5, wherein the predetermined dimension of the pad is less than the number of characters of plain text being combined logically.

8. The encryption method of claim 5, wherein the corresponding characters of the pad are determined subject to an offset.

9. The encryption method of claim 5 further comprising choosing the selected character file in a computer memory from one of a plurality of character files in the computer memory before logically combining characters of a selected character file.

10. The encryption method of claim 9, wherein the dimension of the pad is greater than the number of characters of plain text being combined logically.

11. The encryption method of claim 9, wherein the dimension of the pad is less than the number of characters of plain text being combined logically.

12. The encryption method of claim 9, wherein the corresponding characters of the pad are determined subject to an offset.

13. An encryption method comprising:

logically combining characters of a selected character file in computer memory with corresponding random numbers to produce a pad of predetermined dimension, and logically combining characters of plain text with corresponding elements of the pad, wherein the corresponding characters of the pad are determined subject to an offset, and wherein the offset is a function of a selected password.

14. A method for operation on a computer, comprising:

installing an encryption program from an external storage source, selecting a seed file, and exclusive ORing pseudo random numbers with characters from the seed file to generate a pad.

15. The method according to claim 14 wherein the pad is stored on a floppy disk.

16. The method according to claim 14 wherein the pad is stored on a flash memory.

* * * * *